United States Patent [19]
Kobayashi

[11] Patent Number: 5,754,182
[45] Date of Patent: May 19, 1998

[54] SHAPE MODEL GENERATION DEVICE FOR GENERATING SHAPE MODELS WITH A REDUCED NUMBER OF POLYGONS WHILE MAINTAINING QUALITY OF THE TWO-DIMENSIONAL IMAGE OF THE GENERATED SHAPE MODELS

[75] Inventor: Tadashi Kobayashi, Ibaraki, Japan

[73] Assignee: Matsushita Electric Industrial Co., Ltd., Osaka-Fu, Japan

[21] Appl. No.: 555,035

[22] Filed: Nov. 8, 1995

[30] Foreign Application Priority Data

Nov. 9, 1994 [JP] Japan .................. 6-274910

[51] Int. Cl.⁶ .................. G06T 17/00
[52] U.S. Cl. .................. 345/423
[58] Field of Search .................. 395/119, 1, 123, 395/125, 128, 129, 133, 141; 345/423

[56] References Cited

U.S. PATENT DOCUMENTS 5,377,313  12/1994  Scheibl .................. 395/122
5,555,356   9/1996  Scheibl .................. 395/134

FOREIGN PATENT DOCUMENTS 6231276  8/1994  Japan .

OTHER PUBLICATIONS

"VLSI Implementation of a Buffer, Univrsal Quantizer and Frame Rate Control Processor", by H. Uwabu et al. 928/ SPIE vol. 1605, Nov. 11, 1991.

"A Coding Control Algorithm for Motion Picture Coding Accomplishing Optimal Assignment of Coding Distortion to Time and Space Domains", by Y. Kato et al., Electronics and Communications in Japan Japan, Part 1, vol. 72, No. 9, 1989.

Primary Examiner—Almis R. Jankus
Attorney, Agent, or Firm—Price, Gess & Ubell

[57] ABSTRACT

An image generation system having a shape model generation device for generating a set of polygons which approximates a given solid having a curved surface and output vertex coordinates of each polygon in a screen coordinate system. An image generation device is provided for generating images for each polygon on receiving the vertex coordinates, and an image display device displays the generated images. The shape model generation device divides the solid into a set of polygons in a virtual-space, where the number of polygons used for dividing the solid into polygons is minimized while maintaining a high-quality display image. The set of polygons are projected onto a screen based on a designated view point and direction in the virtual-space, and the vertex coordinates of each polygon is transformed into two-dimensional screen coordinates. An edge judgment unit is provided in the shape model generation device for judging whether any side of each screen-projected polygon constitutes a part of an outline of the set of screen-projected polygons. An edge change unit in the shape model generation device generates a new vertex in the virtual-space on any side which constitutes a part of the outline, and the coordinates of the new vertex are transformed into two-dimensional screen coordinates. A polygon division unit is provided for dividing a screen-projected polygon including any side which constitutes a part of the outline into smaller screen-projected polygons at the new vertex.

25 Claims, 24 Drawing Sheets

Fig. 4

| | -π V00 | -π/2 V01 | V02 | V03 | 0 V04 | V05 | π/2 V06 | V07 | π b V08 |
|---|---|---|---|---|---|---|---|---|---|
| π/2 | V10 | V11 | V12 | V13 | V14 | V15 | V16 | V17 | V18 |
| π/4 | V20 | V21 | V22 | V23 | V24 | V25 | V26 | V27 | V28 |
| 0 | V30 | V31 | V32 | V33 | V34 | V35 | V36 | V37 | V38 |
| -π/4 | V40 | V41 | V42 | V43 | V44 | V45 | V46 | V47 | V48 |
| -π/2 a | | | | | | | | | |

Fig. 6A
Fig. 6B
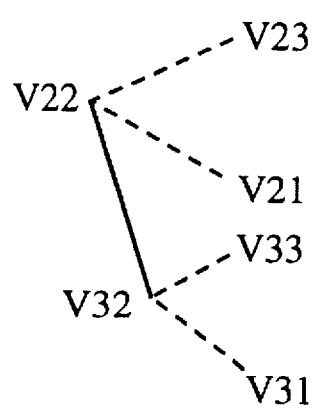
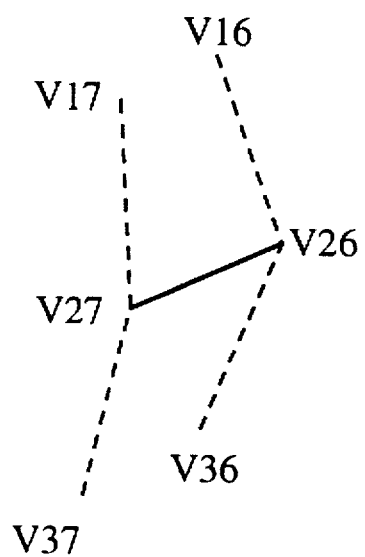

Flowchart for Shape Transformation Unit

Flowchart for Coordinate Transformation Unit

Flowchart for Edge Judgement Unit

Flowchart for Edge Judgement Unit

Flowchart for Edge Change Unit

Flowchart for Polygon Division Unit

Flowchart for Edge Division Unit

Flowchart for Edge Division Unit

SHAPE MODEL GENERATION DEVICE FOR GENERATING SHAPE MODELS WITH A REDUCED NUMBER OF POLYGONS WHILE MAINTAINING QUALITY OF THE TWO-DIMENSIONAL IMAGE OF THE GENERATED SHAPE MODELS

BACKGROUND OF THE INVENTION

1. Field of the Invention

The present invention relates to a shape model generation device for generating a three-dimensional shape model for image display in an image generation system.

2. Description of the Related Art

In recent years, there has been a remarkable progress in the field of computer graphics. An image generation system which is capable of generating high-quality images like photographs has been developed. The images are generated by a shape model.

FIG. 1 shows an example of a conventional image generation system, which comprises shape model generation device 101, image generation device 102, and image display device 103. Shape model generation device 101 outputs a shape model expressed by three-dimensional coordinates to image generation device 102. Image generation device 102 receives the shape model and executes three-dimensional image generation processing, and outputs an image to image display device 103. Image display device 103 displays the image.

In such an image generation system, a set of polygons is often used as a means to represent a shape model. In order to represent a curved surface of a solid, a plurality of polygons are also used to approximate it. In such a case, shape model generation device 101 calculates vertices of the polygons, using formulas which express a curved surface. FIG. 2A and FIG. 2B respectively show shape models of a sphere generated by shape model generation device 101, the shape model being approximated by a set of polygons. The next formulas are used to generate the shape models.

$$X = R \cos a \sin b$$

$$Y = R \sin a$$

$$Z = -R \cos a \cos b$$

Contents of the above formulas are explained as follows: (X, Y, Z) expresses three-dimensional coordinates of vertices of a polygon; R expresses a radius of a sphere; and a and b express parameters, respectively. By changing the values of a from $\pi/2$ to $-\pi/2$, and b from $-\pi$ to $\pi$, a shape model of a sphere can be generated. In FIG. 2A, a set of 32 polygons approximates to a sphere, the values of a and b being changed by $\pi/4$ within each range. In FIG. 2B, a set of 128 polygons approximates to a sphere, the values of a and b being changed by $\pi/8$ within each range. Obviously, FIG. 2B is more precise than FIG. 2A. It proves that a more precise shape model can be obtained by greater number of polygons due to the smaller change of the parameters. Accordingly, image display device 103 displays a high-quality image.

On the other hand, in image generation device 102, time needed for image generation processing is in direct proportion to the number of polygons used for a shape model, since processing like shading is applied to each polygon. Therefore, if an image is generated by the shape model of the sphere in FIG. 2B, more processing time is needed compared to the case in FIG. 2A.

As mentioned above, a conventional image generation system has problems: if shape model generation device 101 generates a precise shape model which consists of a large number of polygons in order to output a high-quality image, time needed for image generation increases; if shape model generation device 101 generates a shape model which consists of a small number of polygons in order to realize high-speed image generation, the quality of the image deteriorates.

SUMMARY OF THE INVENTION

It is an object of the present invention to provide a shape model generation device which is capable of generating a precise shape model even though a small number of polygons is used for approximation in order to display a solid having a curved surface, the shape model ensuring high-quality of the output image.

The above object is achieved by the following construction. (1) In an image generation system having a shape model generation device for generating a set of polygons which approximates to a given solid and outputting vertex coordinates of each polygon in a screen coordinate system, an image generation device for generating images applying shading and the like to each polygon on receiving the vertex coordinates from the shape model generation device, and an image display device for displaying an image generated by the image generation device, the shape model generation device comprises: a shape transformation unit for transforming the solid having a given curved surface to the set of polygons approximating to a shape of the solid in a virtual-space, with a number of polygons being smaller than a standard division number for dividing the solid into polygons in order to display high-quality image by the image display device; a coordinate transformation unit for projecting the set of polygons transformed by the shape transformation unit on a screen based on a designated view point and direction in the virtual-space, and transforming vertex coordinates of each polygon of the set of polygons to two-dimensional screen coordinates; an edge judgement unit for judging whether each side of each screen-projected polygon constitutes a part of an outline of the set of screen-projected polygons; an edge change unit for generating a new vertex in the virtual-space on any side which the edge judgement unit judged to constitute a part of the outline and transforming coordinates of the new vertex to two-dimensional screen coordinates; and a polygon division unit for dividing a screen-projected polygon including any side which the edge judgement unit judged to constitute a part of the outline into smaller screen-projected polygons at the new vertex transformed by the edge change unit.

In the above construction, polygons whose sides constitute the outline are small and others are large so that the shape model becomes accurate, the total of the polygons being kept at a minimum number. Then the shape model generation device outputs a shape model of the minimum number of polygons so that the image generation system generates high-quality image with high-speed.

(2) The shape transformation unit may include: a first solid storage unit for storing functions which express the shape of the solid beforehand; a polygon mesh generation unit for generating a polygon mesh in which each polygon is seemingly quadrangular; and an intersection point coordinate calculation unit for calculating virtual-space coordinates of each intersection point of the polygon mesh from the functions stored in the first solid storage unit, the virtual-space coordinates being used as data for expressing the solid.

(3) The edge judgement unit may include an outline side detection unit for detecting any side which constitutes a part of the outline of the set of screen-projected polygons from relation of each side and their neighboring two sides in the same direction.

(4) The edge judgement unit may further include a vertex number calculation unit for dividing a screen plane on which the set of polygons is projected into two by an extended line of any side of the screen-projected polygon, counting how many vertices exist in each region resulting from the division by the extended line, and recognizing that the side constitutes a part of the outline if the number of the vertices in each region is not equal.

The above construction makes it easy to detect a side which constitutes a part of the outline when the shape model is projected on a screen.

(5) The edge change unit may include a middle point generation unit for generating a middle point on any side which the edge judgement unit judged to constitute a part of the outline as a new vertex in the virtual-space and transforming coordinates of the middle point to two-dimensional screen coordinates.

The above construction makes it possible to divide a side which constitutes a part of the outline so that the outline becomes more precise.

(6) The shape model generation device may further include an edge change prohibition unit for prohibiting generation of a new vertex by the edge change unit when a length of any side which the edge judgement unit judged to constitute a part of the outline is equal to or shorter than a predetermined first threshold value, the first threshold value corresponding to a value of longest length of a side of a screen-projected polygon for expressing accurate outline.

(7) The edge change unit may further include a middle point generation cancellation unit for calculating distance between the side which constitutes a part of the outline and the new vertex generated by the middle point generation unit, and cancelling the new vertex when the distance is equal to or shorter than a predetermined second threshold value.

(8) A smallest of the second threshold value may correspond to size of a pixel in the image display device.

The above construction makes it possible to prevent increase of division number of a polygon in consideration of the image outputted in the image generation system.

(9) The polygon division unit may include: a dividing-into-two unit for dividing a screen-projected polygon into two, the polygon including one side which the edge judgement unit judged to constitute a part of the outline; and a dividing-into-four unit for dividing a screen-projected polygon into four, the polygon including two or more sides which the edge judgement unit judged to constitute a part of the outline.

The above construction makes it possible to divide polygons whose sides constitute the outline.

(10) The shape model generation device may further include: a re-edge-change unit for generating a new vertex in the virtual-space on a side of the screen-projected polygon divided by the polygon division unit, and transforming coordinates of the new vertex to two-dimensional screen coordinates; a re-edge-change prohibition unit for prohibiting generation of a new vertex by the re-edge change unit when length of the side treated by the re-edge change unit is equal to or shorter than a predetermined first threshold value; a re-edge-change cancellation unit for calculating distance between the side and new vertex treated by the re-edge change unit and cancelling the new vertex when the distance is equal to or shorter than a predetermined second threshold value; and a re-polygon-division unit for re-dividing a screen-projected polygon which was divided at the new vertex generated by the re-edge-change unit.

The above construction makes it possible to generate an accurate shape model by dividing polygons whose sides constitute the outline.

(11) The shape transformation unit may include: a second solid storage unit for storing the shape of the solid as virtual-space coordinates of vertices of the set of quadrangular polygons; and a vertex read-out unit for reading out coordinates stored in the second solid storage unit at intervals, the coordinates being used as data for expressing a solid.

The above construction makes it possible to generate a shape model of a solid having complicated shape.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawing:

FIG. 4 shows data structure of a shape model transformed by a shape transformation unit.

FIG. 6A shows how to detect a side which constitutes a part of the outline.

FIG. 6B shows how to detect a side which constitutes a part of the outline.

DESCRIPTION OF THE PREFERRED EMBODIMENT (Embodiment 1)

Figure 3:
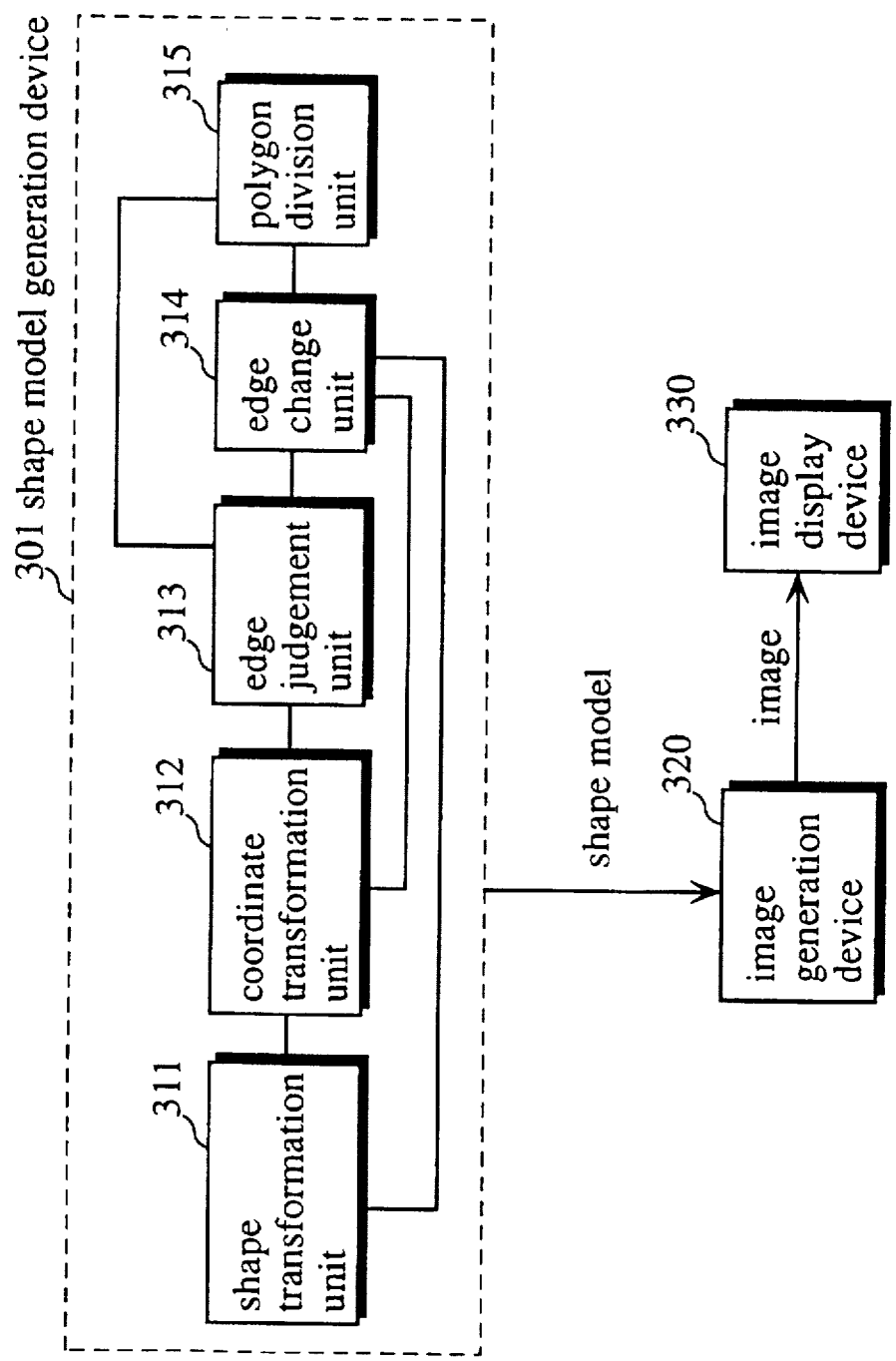
FIG. 3 shows construction of a shape model generation device of Embodiment 1 of the present invention.

FIG. 3 shows construction of a shape model generation device of Embodiment 1 of the present invention. This figure also shows construction of an image generation system including the shape model generation device.

Shape model generation device 301 comprises shape transformation unit 311, coordinate transformation unit 312, edge judgement unit 313, edge change unit 314, and polygon division unit 315.

The image generation system comprises shape model generation device 301, image generation device 320, and image display device 330.

Shape transformation unit 311 comprises a solid function storage unit, a division number designation receive unit, a three-dimensional vertex coordinate calculation unit, and a vertex coordinate storage unit, all of which are not illustrated. Shape transformation unit 311 transforms a solid expressed by a function to virtual-space coordinates of each vertex of polygons approximating to a shape of the solid.

The solid function storage unit stores the following function formula which gives position coordinates of a sphere, which is an example of a solid having a curved surface, in a virtual space.

$$X = R \cos a \sin b$$
$$Y = R \sin a$$
$$Z = -R \cos a \cos b$$

Formula (1)

R is a radius of a sphere, and values of parameters a and b are $\pi/2 \geq a \geq -\pi/2$ and $-\pi \leq b \leq \pi$, respectively. The solid function storage unit also stores the ranges of parameters a and b.

The division number receiving unit is instructed by an operator to divide a sphere by a number of N in the vertical direction and a number of M in the horizontal direction so that the sphere is divided into N×M polygons, with N and M being smaller numbers than a division number (standard division number) for outputting a high-quality image in a conventional image generation system. Then this unit notifies the three-dimensional vertex coordinate calculation unit of division numbers N and M.

On receiving the division numbers N and M from the division number designation receiving unit, the three-dimensional vertex coordinate calculation unit:

(1) reads out the ranges of parameter a in the vertical direction and parameter b in the horizontal direction, both parameters being stored in the solid function storage unit;

(2) decides increment $\Delta a$ of parameter a by dividing the value of the range of parameter a by division number N, and decides increment $\Delta b$ of parameter b by dividing the value of the range of parameter b by division number M;

(3) sets value n of a first counter (not illustrated) to 0, and gives initial value $A_0$ (value of either end of the range of parameter a) to parameter a;

(4) sets value m of a second counter (not illustrated) to 0, and gives initial value $B_0$ to parameter b;

(5) reads out Formula (1) in the solid function storage unit;

(6) calculates three-dimensional coordinates (X, Y, Z) of a vertex by substituting parameters a and b into Formula (1) and stores them in the vertex coordinate storage unit;

(7) adds 1 to value m of the second counter, increment $\Delta b$ to parameter b, calculates three-dimensional coordinates by substituting "m+1" and "parameter b+ increment $\Delta b$" into Formula (1), and stores them in the vertex coordinate storage unit, repeating this processing until value m of the second counter corresponds to M+1; and (8) adds 1 to value n of the first counter, increment $\Delta a$ to parameter a, and executes the same processing as (4)–(7), repeating this processing until value n of the first counter corresponds to N+1.

The vertex coordinate storage unit stores three-dimensional coordinates (X, Y, Z) of vertex Vnm of a polygon. FIG. 4 shows notional data structure of a transformed shape model when a sphere expressed by Formula (1) is approximated by 32 polygons, with N being 4 and M being 8. This shape model has a polygon mesh structure, which looks like a set of quadrangles connected like a net for the sake of form. In reality, vertices V00, V01, V02, . . . , V08 share (0, R, 0), and vertices V40, V41, V42, . . . , V48 share (0, −R, 0). So the polygon mesh structure of an upper and a lower side of the data structure is something like triangles being connected like a net. Also, V10 and V18 are the same vertex; V20 and V28 are the same; and V30 and V38 are the same.

Coordinate transformation unit 312 comprises a position and direction designation receiving unit, a view point coordinate calculation unit, and a screen coordinate storage unit, all of which are not illustrated. This unit 312 transforms coordinates of each vertex of the set of polygons transformed by shape transformation unit 311 to coordinates of each vertex in the screen coordinate system.

Position and direction designation receiving unit receives a view point and view direction which are to be used to transform a solid in a virtual space into a view point coordinate system, and notifies the view point coordinate calculation unit of them. In the view point coordinate system, the view point exists at the origin, and Z-axis is treated as a view direction. View point is set at (x, y, z). The view direction rotates around X-axis by $\theta x$, around Y-axis by $\theta y$, around Z-axis by $\theta z$, with Z-axis being used as basis.

The view point coordinate system calculation unit obtains transformation matrixes T, Rx, Ry, and Rz($\theta$), on receiving (x, y, z) and $\theta x$, $\theta y$, $\theta z$ from the position and direction designation receiving unit: T parallel moves the virtual-space coordinates by dx in the direction of X-axis, by dy in the direction of Y-axis, and by dz in the direction of Z-axis; Rx rotates the virtual-space coordinates around the X-axis by θx; Ry rotates the virtual-space coordinates around the Y-axis by θy; and Rz(θ) rotates the virtual-space coordinates around the Z-axis by θz. The transformation matrixes are expressed in the following way:

$$T = \begin{bmatrix} 1 & 0 & 0 & dx \\ 0 & 1 & 0 & dy \\ 0 & 0 & 1 & dz \\ 0 & 0 & 0 & 1 \end{bmatrix}$$

$$Rx = \begin{bmatrix} 1 & 0 & 0 & 0 \\ 0 & \cos\theta x & -\sin\theta x & 0 \\ 0 & \sin\theta x & \cos\theta x & 0 \\ 0 & 0 & 0 & 1 \end{bmatrix}$$

$$Ry = \begin{bmatrix} \cos\theta y & 0 & \sin\theta y & 0 \\ 0 & 1 & 0 & 0 \\ -\sin\theta y & 0 & \cos\theta y & 0 \\ 0 & 0 & 0 & 0 \end{bmatrix}$$

$$Rz(\theta) = \begin{bmatrix} \cos\theta z & -\sin\theta z & 0 & 0 \\ \sin\theta z & \cos\theta z & 0 & 0 \\ 0 & 0 & 1 & 0 \\ 0 & 0 & 0 & 1 \end{bmatrix}$$

Next, the view point coordinate system calculation unit obtains transformation matrix M in the following way.

$$M = T \cdot Rz \cdot Ry \cdot Rx$$

After that, this unit obtains $M^{-1}$, which is an inverse of the transformation matrix M.

The view point coordinate system calculation unit successively reads out three-dimensional coordinates (X, Y, Z) of polygon vertex Vnm, (X, Y, Z) being stored in the vertex coordinate storage unit of shape transformation unit 311. According to Formula (2), this unit calculates (x', y', z'), which is three-dimensional coordinates of polygon vertex Vnm transformed into the view point coordinate system.

$$\begin{bmatrix} x' \\ y' \\ z' \\ 1 \end{bmatrix} = M^{-1} \begin{bmatrix} X \\ Y \\ Z \\ 1 \end{bmatrix} \quad \text{Formula (2)}$$

The view point coordinate system calculation unit successively stores three-dimensional coordinates (x', y', z') of vertex Vnm in the view point coordinate system in the screen coordinate storage unit. When this unit finishes processing of all vertices Vnm, it activates edge judgement unit 313.

Figure 5:
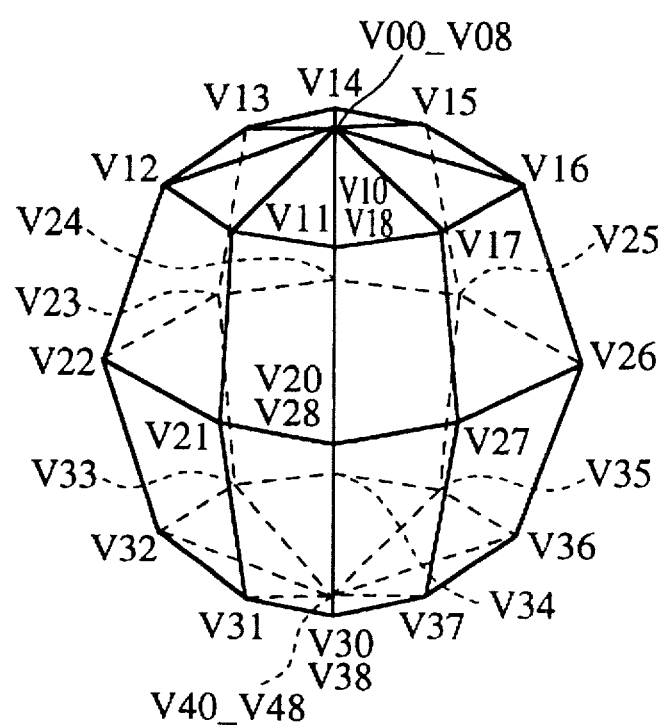
FIG. 5 shows a shape model (a set of polygons) projected on a screen from the data contents in FIG. 4.

The screen coordinate storage unit stores three-dimensional coordinates (x', y', z') of the each vertex Vnm of a set of polygons in the view point coordinate system. The values of (x', y') are equal to those of the two-dimensional coordinates in the screen coordinate system. Moreover, the screen coordinate storage unit has the same data structure as the polygon mesh in FIG. 4. FIG. 5 shows a set of polygons displayed based on the screen coordinates stored in the screen coordinate storage unit. As parallel projection was used for the transformation to the screen coordinate system, the values of (x', y') in the view point coordinate system and the two-dimensional coordinates in the screen coordinate system are the same. If perspective projection is used, the values of sx and sy of the two-dimensional coordinates in the screen coordinate system are expressed as follows.

$$sx = x'/y'$$

$$sy = y'/z'$$

Also, (x', y') or (sx, sy) in the screen coordinate system is multiplied by a coefficient, if necessary. By this multiplication, position of the image can be decided on the level of pixel.

Edge judgement unit 313 comprises a screen coordinate read-out unit, a judging formula generation unit, a judging formula calculation unit, a first counter unit and a flag unit, all of which are not illustrated. Edge judgement unit 313 judges whether each side of the set of polygons transformed into the screen coordinate system constitutes a part of an outline. When a side constitutes a part of the outline, this unit 313 sets a flag On on this side.

The first counter unit of edge judgment unit 313:

(1) on being activated by coordinate transformation unit 312, sets value n of a third counter, value m of a fourth counter, value A of a fifth counter, and value B of a sixth counter to 0 and activates the screen coordinate read-out unit;

(2) adds 1 to value m of the fourth counter on receiving instruction of adding 1 from either the flag unit or screen coordinate read-out unit, judges whether value m of the fourth counter corresponds to m0−1, adds 1 to value n of the third counter if they correspond, and sets volume A of the fifth counter and volume B of the sixth counter to 0 if they don't;

(3) judges whether value n of the third counter corresponds to n0−1, sets volume m of the fourth counter, volume A of the fifth counter and volume B of the sixth counter to 0 if they don't correspond, and activates the screen coordinate read-out unit; and (4) sets value n of the third counter, value m of the fourth counter, volume A of the fifth counter, and volume B of the sixth counter to 0 and activates the screen coordinate read-out unit when they correspond for the first time in (3), and activates edge change unit 314 when they correspond for the second time.

The screen coordinate read-out unit:

(1) on being activated by the first counter unit, reads out a number of n0 in the vertical direction and a number of m0 in the horizontal direction of vertices Vnm stored in the screen coordinate storage unit of coordinate transformation unit 312, and notifies the first counter unit of them;

(2) reads out value n of the third counter and value m of the fourth counter when value A of the fifth counter and value B of the sixth counter of the first counter unit are set to 0;

(3) reads out two-dimensional coordinates (x', y') of vertices Vnm and V(n+1)m stored in the screen coordinate storage unit until value n of the third counter corresponds to n0−1 for the first time based on values n and m, and notifies the judging formula generation unit of them;

(4) after that successively reads out coordinates of vertices Vn(m−1), Vn(m+1), V(n+1)(m−1), and V(n+1)(m+1) from the screen coordinate storage unit, and notifies the judging formula calculation unit of them; when q of vertex Vpq is −1, q is always supposed to be m0−2;

(5) after value n of the third counter corresponds to n0−1 in (3), reads out coordinates of vertices Vnm and Vn(m+1) from the screen coordinate storage unit and notifies the judging formula generation unit of them, and instructs the first counter unit to add 1 when the coordinates of vertices Vnm and Vn(m+1) are the same, with (6) being omitted; and (6) after notifying the judging formula generation unit of the coordinates, successively reads out coordinates of vertices V(n−1)m, V(n+1)m, V(n−1)(m+1), V(n+1)(m+1) from the screen coordinate storage unit and notifies the judging formula calculation unit of them.

The judging formula generation unit stores Formula (3), which is a formula for judging whether a side constitutes a part of the outline.

$$K=(Y2-Y1)(X-X1)-(X2-X1)(Y-Y1) \quad \text{Formula (3)}$$

On receiving two-dimensional coordinates of two vertices Vnm and V(n+1)m or two vertices Vnm and Vn(m+1) from the screen coordinate read-out unit, the judging formula generation unit generates a judging formula by substituting first coordinates (X, Y) for (X1, Y1), second coordinates (X, Y) for (X2, Y2) in Formula (3), and notifies the judging formula calculation unit of it. If the judging formula is not true for line segment Vnm Vn(m+1) in the horizontal direction: specifically, if Vnm and Vn(m+1) are the same vertex, this line segment should not be treated as a side.

On receiving coordinates (X, Y) of Vn(m−1) and other vertices from the screen coordinate read-out unit, the judging formula calculation unit calculates value K by successively substituting the coordinates for X and Y of the judging formula notified from the judging formula generation unit. Then this unit notifies the flag unit of value K.

The flag unit judges whether value K is positive or negative on being notified it from the judging formula calculation unit. If the value is positive, this unit adds 1 to value A of the fifth counter of the counter unit; if the value is negative, this unit adds 1 to value B of the sixth counter of the first counter unit. On receiving four values K, this unit reads out value A of the fifth counter and value B of the sixth counter. If A and B do not correspond, this unit judges that line segment Vnm V(n+1)m or line segment Vnm Vn(m+1) constitutes a part of the outline, and turns a flag ON; If they correspond, or if the flag is turned ON, this unit instructs the first counter unit to add 1.

FIG. 6A and FIG. 6B show how a side is judged a constituent of the outline of a set of polygons shown in FIG. 5. The set of polygons is expressed in the screen coordinate system shown in FIG. 5 (projected on a screen).

Formula (3) expresses line segment V22 V32 in FIG. 6A, when (x', y') of vertices V22 and V32 are substituted for X1, Y1 and X2, Y2, with K being 0. Also, Formula (3) expresses line segment V26 V27 in FIG. 6B when (x', y') of vertices V26 and V27 are substituted for X1, Y1 and X2, Y2, with K being 0.

The type of value K, whether K is positive or negative to be more specific, indicates which side of the line segment do the vertices belong to. Detection of a side which constitutes a part of the outline is realized by confirming the distribution of the vertices.

In FIG. 6A, vertices V21 and V23 in the neighborhood of vertex V22 and vertices V31 and V33 in the neighborhood of vertex 32 are on the same side of line segment V22 V32. Therefore, all values K are either positive or negative. If just exactly half of values K are neither positive nor negative, which means equal number of vertices do not exist on both side, this line segment constitutes a part of the outline.

In FIG. 6B, vertices 16 and 17 exist on one side of line segment V27 V26, and vertices 36 and 37 on the other side. So two values K are positive and the other two are negative. If just exactly half of values K are positive and the other half are negative, this line segment does not constitute a part of the outline, which is obvious from FIG. 5.

If it is guaranteed that all four vertices of all the polygons (quadrangles) constituting a polygon mesh are on the same plane (a sphere satisfies this condition) when a shape model expressed by a three-dimensional coordinates is generated, two vertices are substituted into the judging formula. When a side is line segment Vnm V(n+1)m, the two vertices are Vn(m−1) and Vn(m+1); when a side is line segment Vnm Vn(m+1), the two vertices are V(n−1)m and V(n+1)m. In the latter case, if half of values K are either positive or negative, the line segment does not constitute a part of the outline.

As the sphere used as an example in the present Embodiment is closed, all sides have vertices in their neighborhood. But if a shape model having a curved surface is not closed, some sides have less number of vertices in their neighborhood. Such sides are regarded as constituents of the outline unconditionally.

Figure 7:
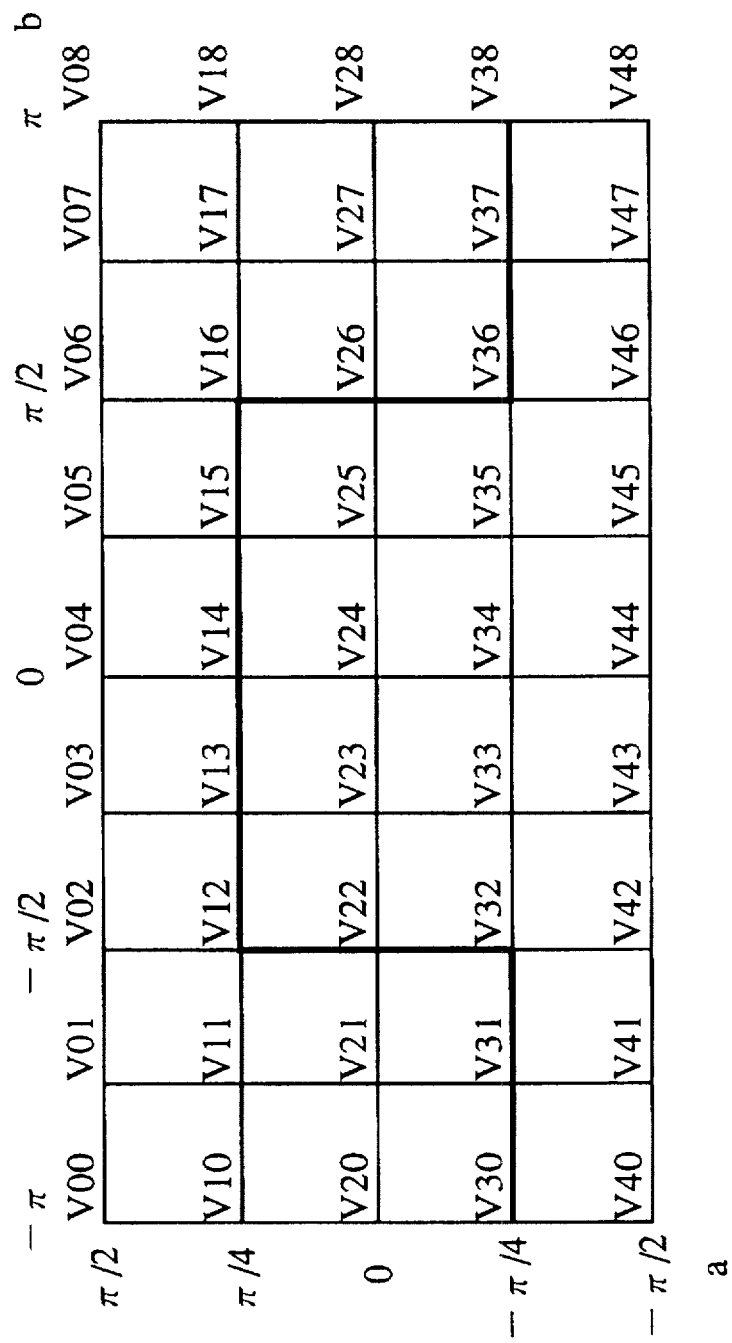
FIG. 7 shows sides which an edge judgement means judged to constitute the outline.

The bold line in FIG. 7 shows sides on which flags are turned ON by the flag unit as they constitute the outline.

Edge change unit 314 comprises a division point generation unit, a middle point coordinate transformation unit, a middle point coordinate storage unit, and a second counter unit, all of which are not illustrated. Edge change unit 314 calculates virtual-space coordinates of a middle point on the sides on which flags are turned ON by edge judgement unit 313 (sides which constitute the outline of a set of polygons on a screen), and transforms them to screen coordinates.

The second counter unit of edge change unit 314:

(1) on being activated by edge judgement unit 313, reads out numbers of n0 in the vertical direction and m0 in the horizontal direction of vertices Vnm of the polygon mesh stored in the screen coordinate storage unit of coordinate transformation unit 312, sets value n of a seventh counter and value m of an eighth counter to 0, and activates the division point generation unit;

(2) adds 1 to value m of the eighth counter on receiving notification of adding 1 from the division point generation unit or middle point coordinate transformation unit;

(3) judges whether value m of the eighth counter corresponds to m+1, activates the division point generation unit if they do not correspond, and adds 1 to value n of the seventh counter if they correspond;

(4) judges whether value n of the seventh counter corresponds to n0−1, sets value m of the eighth counter to 0 if they do not correspond, sets value n of the seventh counter and value m of the eighth counter to 0 if they correspond for the first time, activating the division point generation unit; and (5) activates polygon division unit 315 if they correspond for the second time.

The division point generation unit:

(1) on being activated by the second counter unit, stores contents in the screen coordinate storage unit of coordinate transformation unit 312 in the middle point coordinate storage unit and reads out value n of the seventh counter and value m of the eighth counter;

(2) judges from values n and m whether a flag is turned ON on line segment Vnm V(n+1)m by checking the flag unit of edge judgement unit 313 until value n of the seventh counter corresponds to n0−1 for the first time;

(3) instructs the second counter unit to add 1 if a flag in OFF;

(4) if a flag is ON, fetches increment $\Delta a$ of parameter a and increment $\Delta b$ of parameter b, both of which are decided by the three-dimensional vertex coordinate calculation unit of shape transformation unit 311;

(5) obtains virtual-space coordinates of middle point VVs on line segment Vnm V(n+1)m by substituting {$A_0$+ (2n+1)$\Delta a$/2} and ($B_0$+m$\Delta b$) for parameters a and b in Formula (1) stored in the solid function storage unit of shape transformation unit 311;

(6) notifies the middle point coordinate transformation unit of (X, Y, Z), which are virtual-space coordinates of middle point VVs;

(7) after value n of the seventh counter corresponds to n0−1 for the first time in (2), judges from values n and m whether a flag is ON on line segment Vnm Vn(m+1) by checking the flag unit of edge judgement unit 313, and executes the same processing as (3)−(4); and (8) obtains virtual-space coordinates of middle point VVs on line segment Vnm Vn(m+1) by substituting ($A_0$+ n$\Delta a$) and {$B_0$+(2m+1)$\Delta b$/2} for parameters a and b in Formula (1) stored in the solid function storage unit of shape transformation unit 311, and executes the same processing as (6).

On receiving notification of virtual-space coordinates (X, Y, Z) of middle point VVs from the division point generation unit, the middle point coordinate transformation unit transforms them to screen coordinates (x', y', z') like the case of coordinate transformation unit 312, and stores them in the middle point coordinate storage unit.

Moreover, for the subscript s of middle point VVs, values of m of Vnm are given from 0 in a serial order.

Figure 8:
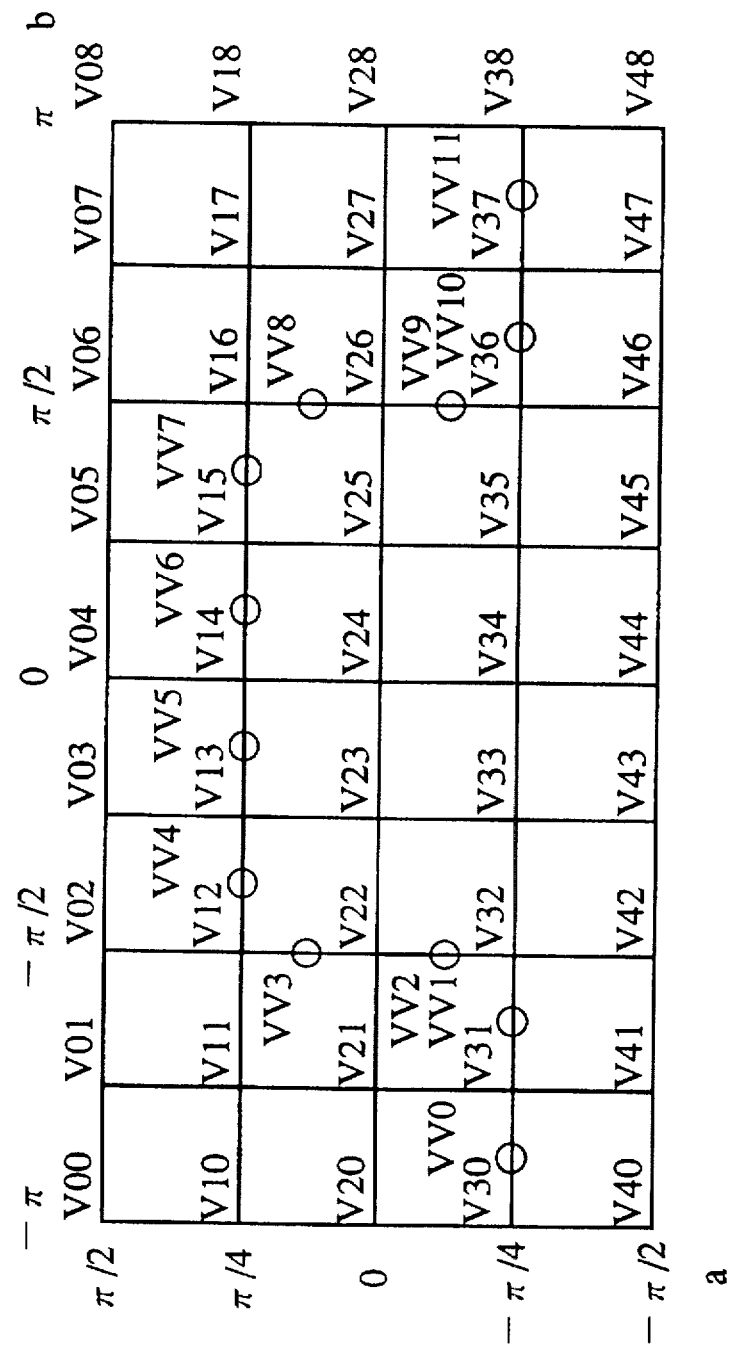
FIG. 8 shows data structure in which middle points of the sides which constitute the outline are generated as new vertices by an edge change unit.

The middle point coordinate storage unit stores screen coordinates of each vertex Vnm as shown in FIG. 8, and is made to store screen coordinates of middle point VVs of a side which constitutes a part of the outline by the middle point coordinate transformation unit.

Figure 9:
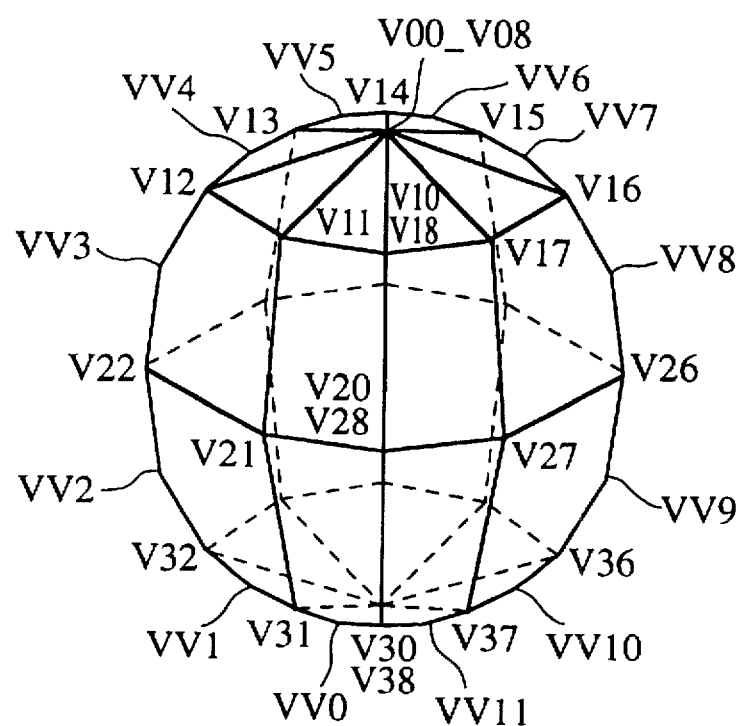
FIG. 9 shows data contents projected on a screen.

Specifically, the middle point coordinate storage unit obtains virtual-space coordinates of middle points VV0−VV11 shown in FIG. 8 from Formula (1) stored in the solid function storage unit of shape transformation unit 311, when a flag is ON on line segment Vnm V(n+1)m or line segment Vnm Vn(m+1) of the polygon mesh structure as shown in FIG. 7. A set of polygons projected on a screen as shown in FIG. 9 can be obtained by transforming the virtual-space coordinates to screen coordinates. In FIG. 9, middle points VV0−VV11 on the sides constituting the outline are shown as new vertices, which enhance accuracy of the outline of the set of polygons. The virtual-space coordinates of middle points VV0−VV11 are changed to (x', y', z') in the screen coordinate system by the vertex coordinate transformation unit.

Polygon division unit 315 comprises a flag number judgement unit, an individual polygon division unit, and a third counter unit, all of which are not illustrated.

The third counter unit of polygon division unit 315:

(1) on being activated by the counter unit of edge change unit 314, reads out numbers of n0 in the vertical direction and m0 in the horizontal direction of vertices Vnm of the polygon mesh stored in the middle point coordinate storage unit of edge change unit 314, and sets values n of a ninth counter and a tenth counter to 0 and activates the flag number judgement unit;

(2) on receiving instruction of adding 1 from the individual polygon division unit, adds 1 to value m of the tenth counter, judges whether value m of the tenth counter corresponds to m0−1, activates the flag number judgement unit if they do not correspond, and adds 1 to value n of the ninth counter if they correspond; and (3) judges whether value n of the ninth counter corresponds to n0−1, sets value m of the tenth counter to 0 and activates the flag number judgement unit if they don't correspond, and ends processing if they correspond.

The flag number judgement unit:

(1) on being activated by the third counter unit, sets variable pat to 0;

(2) reads out value n of the ninth counter and value m of the tenth, judges whether a flag is ON on line segment Vnm V(n+1)m stored in the flag unit of edge judgement unit 313, and adds 1 to variable pat if the flag is ON;

(3) judges whether a flag is ON on line segment Vnm Vn(m+1) stored in the flag unit of edge judgement unit 313, and adds 2 to variable pat if the flag is ON;

(4) judges whether a flag is ON on line segment Vn(m+1) V(n+1)(m+1) stored in the flag unit of edge judgement unit 313, and adds 4 to variable pat if the flag is ON;

(5) judges whether a flag is ON on line segment V(n+1)m V(n+1)(m+1) stored in the flag unit of edge judgement unit 313, and adds 8 to variable pat if the flag is ON;

(6) if a value of variable pat is 1 or 4, notifies the individual polygon division unit of a polygon constituted by vertices Vnm, V(n+1)m, V(n+1)(m+1), and Vn(m+1);

(7) if a value of variable pat is 1 or 4, notifies the individual polygon division unit that the polygon should be divided into two by a line between a middle point on line segment Vnm V(n+1)m and a middle point on line segment Vn(m+1) V(n+1)(m+1);

(8) if a value of variable pat is 2 or 8, notifies the individual polygon division unit that the polygon should be divided into two by a line between a middle point on line segment Vnm Vn(m+1) and a middle point on line segment V(n+1)m V(n+1)(m+1); and (9) if a value of variable pat is other than those of (6)−(8), notifies the polygon division means that the polygon should be divided into four by a line between a middle point on line segment Vnm V(n+1)m and a middle point on line segment Vn(m+1) V(n+1)(m+1) and by a line between a middle point on line segment Vnm Vn(m+1) and a middle point on line segment V(n+1)m V(n+1)(m+1).

The individual polygon division unit:

(1) on receiving the notification of the polygon constituted by vertices Vnm, V(n+1)m, V(n+1)(m+1), and Vn(m+ 1) from the flag number judgement unit, reads out coordinates of each vertex of this polygon stored in the middle point coordinate storage unit of edge change unit 314, and outputs them to image generation device 320, outputting value z' along with values x' and y' of screen coordinates in order to use z' for hidden surface elimination and the like;

(2) on receiving the notification of dividing the polygon into two by the line between the middle point on line segment Vnm V(n+1)m and the middle point on line segment Vn(m+1) V(n+1)(m+1) from the flag number judgement unit, divides the polygon constituted by vertices Vnm, V(n+1)m, V(n+1)(m+1), and Vn(m+1) into two by joining middle point coordinates of either line segment stored in the middle point coordinate storage unit of edge change unit 314 and a middle point coordinates of the opposite side, which is calculated by averaging coordinates of vertices Vnm and V(n+1)m or vertices Vn(m+1) and V(n+1)(m+1), outputting coordinates of each vertex of the two polygons to image generation device 320;

(3) on receiving the notification of dividing the polygon into two by the line joining the middle point on line segment Vnm Vn(m+1) and the middle point on line segment V(n+1)m V(n+1)(m+1), divides the polygon into two like the case in (2), outputting coordinates of each vertex of each polygon to image generation device 320;

(4) on receiving the notification of dividing the polygon into four from the flag judgement unit, obtains coordinates of a point situated at the middle of vertices Vnm, V(n+1)m, V(n+1)(m+1), and Vn(m+1) by averaging coordinates of each vertex of the polygon, also obtains coordinates of a middle point on each side like the case in (2) and (3), then divides the polygon into four, outputting coordinates of each vertex of each polygon to image generation device 320; and (5) after outputting screen coordinates of each vertex of the polygon to image generation device 320, instructs the third counter unit to add 1.

Figure 10:
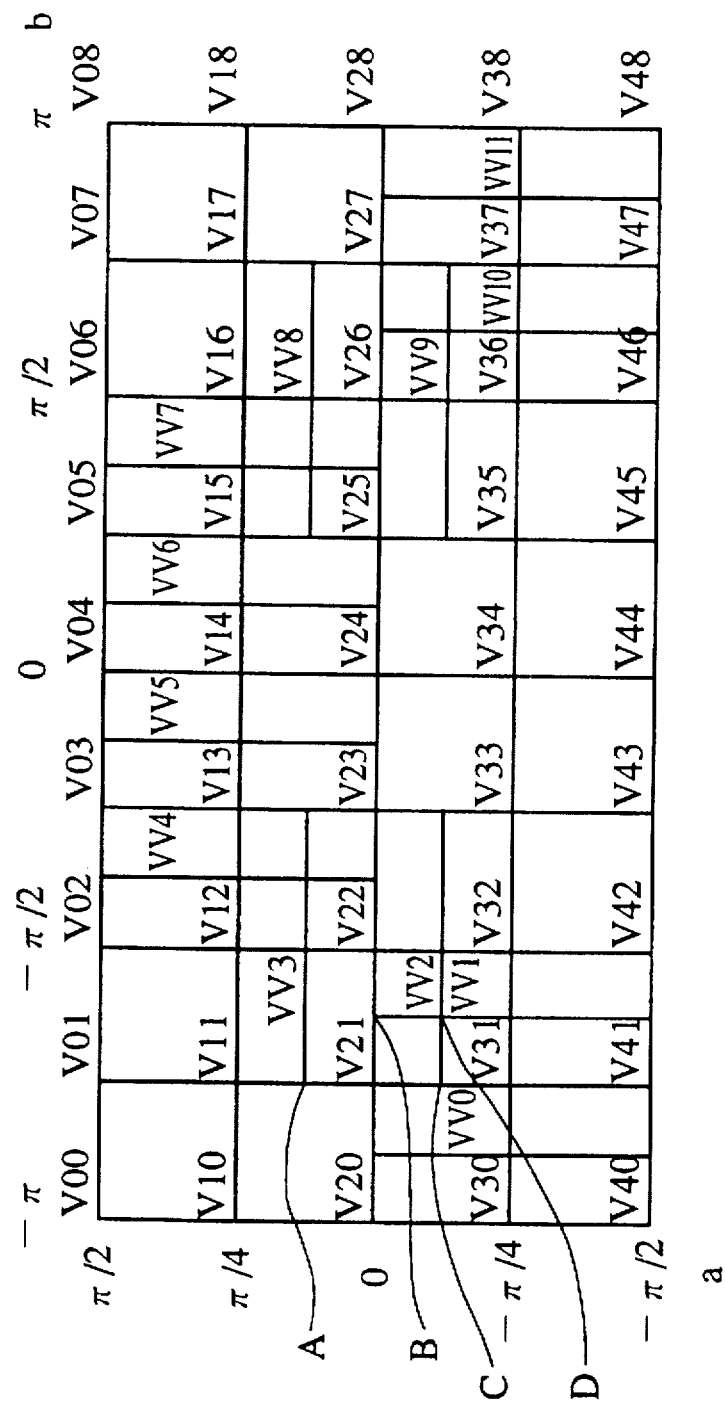
FIG. 10 shows that new polygons were generated by dividing sides which constitute the outline by polygon division unit.

In FIG. 10, each side of polygon V10 V11 V21 V20 does not constitute a part of the outline. So this polygon is not divided.

In polygon V11 V12 V22 V21, line segment V12 V22 constitutes a part of the outline. So this polygon is divided into polygon V11 V12 VV3 A and polygon V22 V21 A VV3.

In polygon V21 V22 V32 V31, line segment V31 V32 and line segment V32 V22 constitute a part of the outline so this polygon is divided into four polygons: polygon V21 B D C; polygon V22 VV2 D B; polygon V31 C D VV1; and polygon V32 VV1 D VV2.

In order to obtain the coordinates of new vertex D, the individual polygon division unit averaged screen coordinates of vertices V21, V22, V32, and V31. Also this unit can calculate a point of intersection of line segment B VV1 and line segment C VV2 as vertex D.

In the present Embodiment, the coordinates of new vertex D is obtained by averaging screen coordinates of each vertex V21, V22, V32, and V31. But the point of intersection of line segment B VV1 and line segment C VV2 can also be used.

Figure 11:
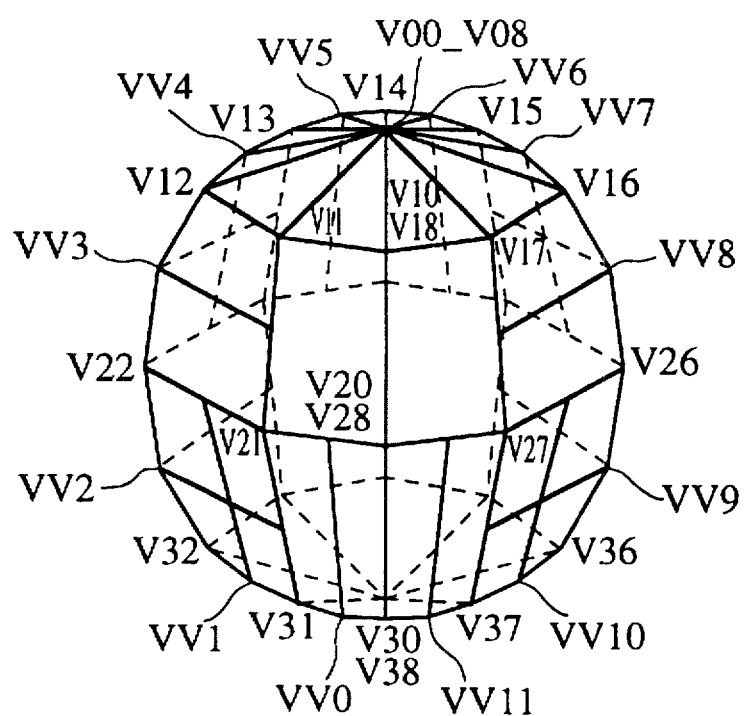
FIG. 11 shows a shape model projected on a screen from the data contents in FIG. 9.

FIG. 11 shows a set of polygons (a shape model) projected on a screen based on the screen coordinates of each vertex of the set of polygons shown in FIG. 10. Shape model generation device 301 first approximates a sphere by 32 polygons, which is about a quarter of the standard division number, generates a shape model constituted by 60 polygons, which is about the half of the standard division number, and outputs the shape model to image generation device 320.

Image generation device 320 generates images, executing hidden surface elimination and shading based on coordinates of each vertex of each polygon constituting the shape model outputted from polygon division unit 315 of shape model generation device 301.

Image display device 330 displays images generated by image generation device 320.

Operation of the present Embodiment is explained by means of flowcharts in FIGS. 12–16 as follows.

Figure 12:
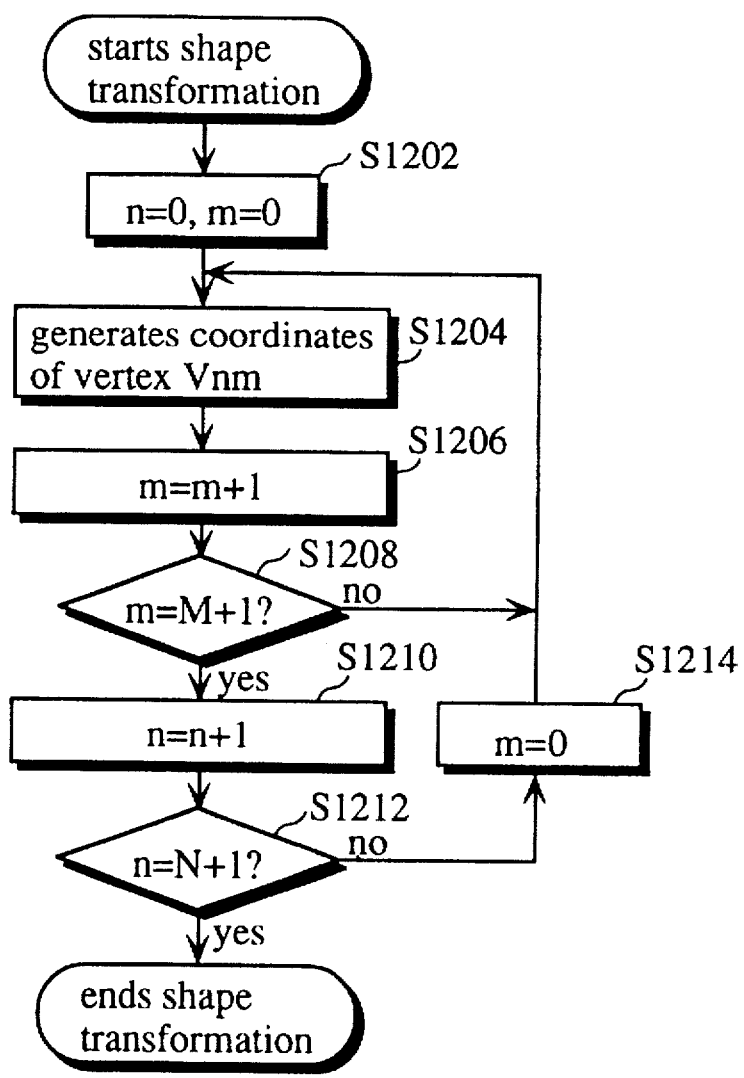
FIG. 12 shows a flowchart for operation of a shape transformation unit.

FIG. 12 shows operation of shape transformation unit 311.

First, the division number designation receiving unit receives division numbers of N in the vertical direction and M in the horizontal direction from an operator, with N and M being smaller numbers than the standard division numbers, and notifies the three-dimensional vertex coordinate calculation unit of them.

The three-dimensional vertex coordinate calculation unit:

(Step 1202) sets value n of the first counter and value m of the second counter to 0;

(Step 1204) reads out the function formula stored in the solid function storage unit, and calculates virtual-space coordinates of vertex Vnm of the polygon by substituting parameters a and b into the function formula, the parameters being calculated from value n of the first counter and value m of the second counter;

(Step 1206) adds 1 to value m of the second counter;

(Step 1208) judges whether value m corresponds to M+1;

(Step 1210) goes back to Step 1204 if they don't correspond, adds 1 to value n of the first counter if they correspond;

(Step 1212) judges whether value n corresponds to N+1;

(Step 1214) sets value m of the second counter to 0 if they do not correspond;

goes back to Step 1204; and ends processing if they correspond.

By the above Steps, three-dimensional coordinates of each vertex Vnm of a set of polygons can be obtained. The number of polygons are smaller than the standard division number.

Figure 13:
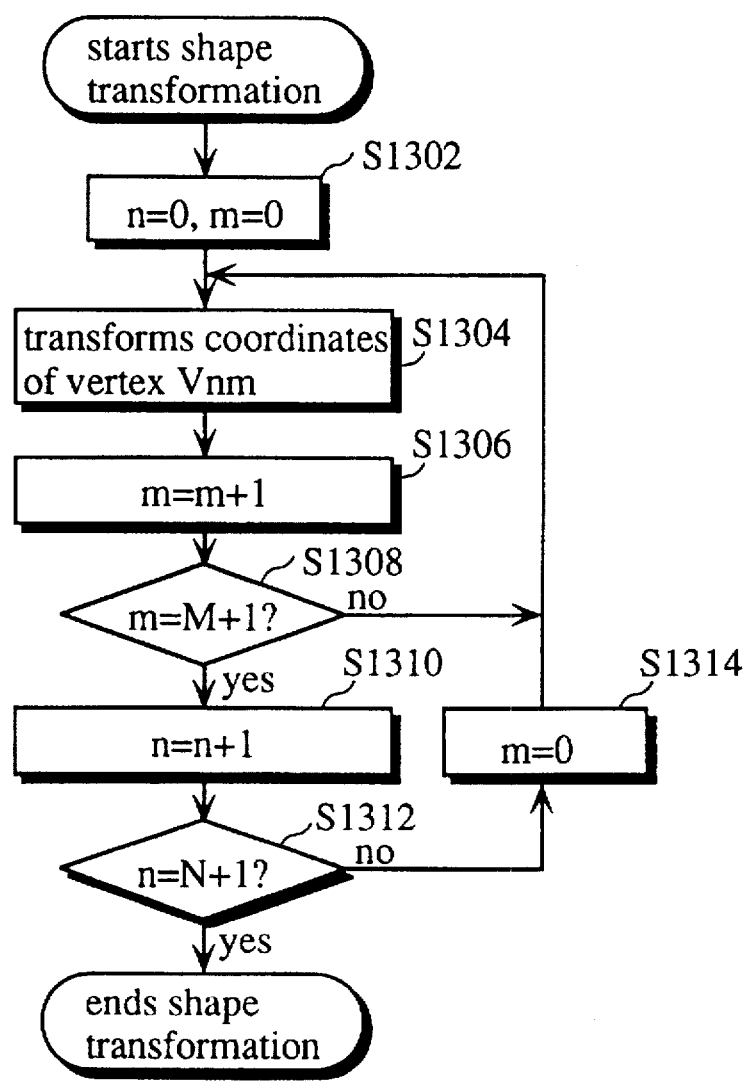
FIG. 13 shows a flowchart for operation of a coordinate transformation unit.

FIG. 13 shows operation of coordinate transformation unit 312, which is similar to that of shape transformation unit 311 except for Step 1304. In Step 1304, vertex Vnm of a polygon in a three-dimensional coordinate system is transformed into a screen coordinate system. So only Step 1304 is explained next.

The view point coordinate calculation unit receives notification of a view point position and view direction received by the position and direction designation receiving unit, obtains transformation matrix M for transformation of a virtual-space coordinate system to a view point coordinate system, calculates view point coordinates of vertex Vnm using Formula (2), and stores the view point coordinates in the screen coordinate storage unit.

Figure 14A:
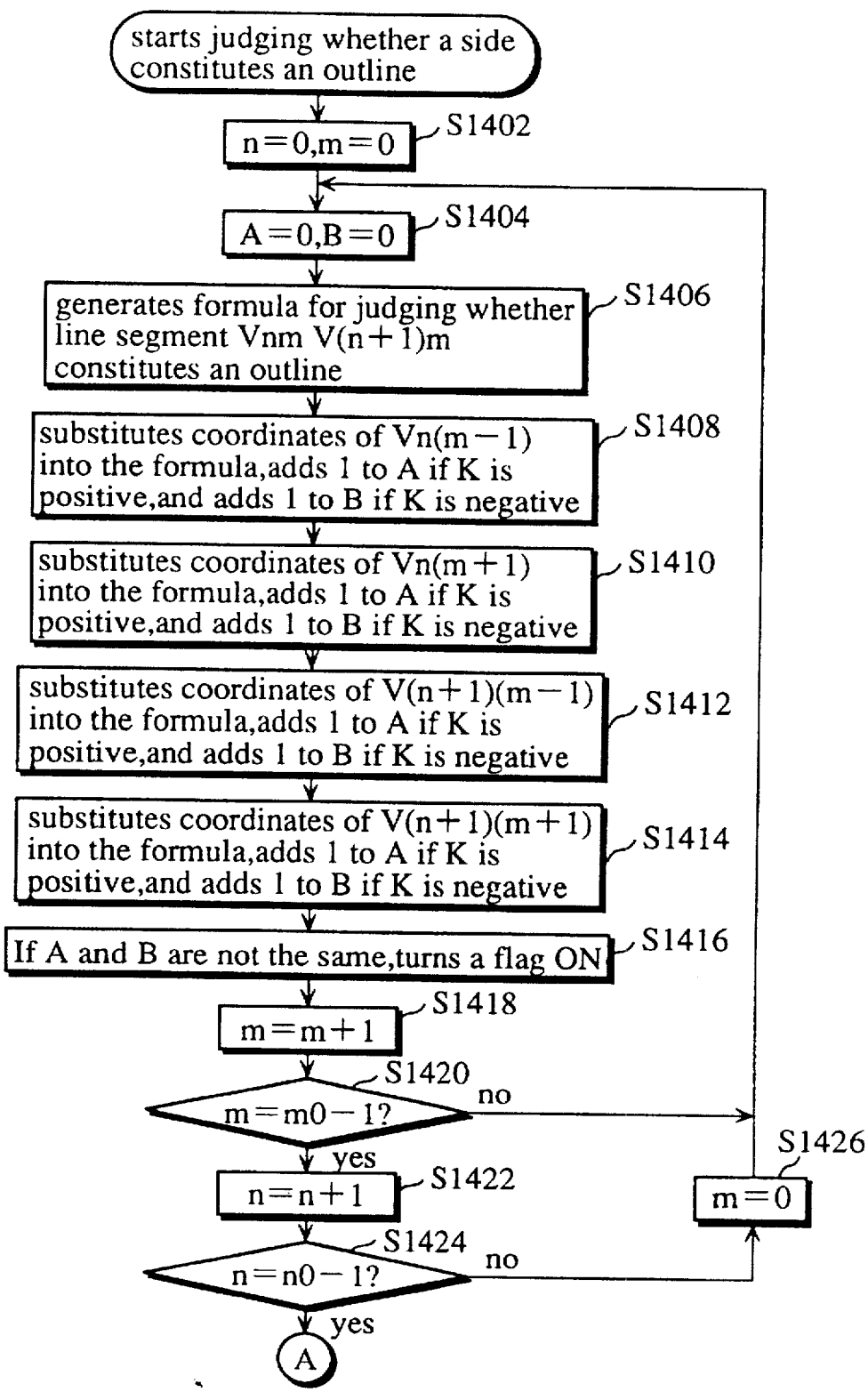
FIG. 14A shows a first half of a flowchart for operation of the edge judgement unit.
Figure 14B:
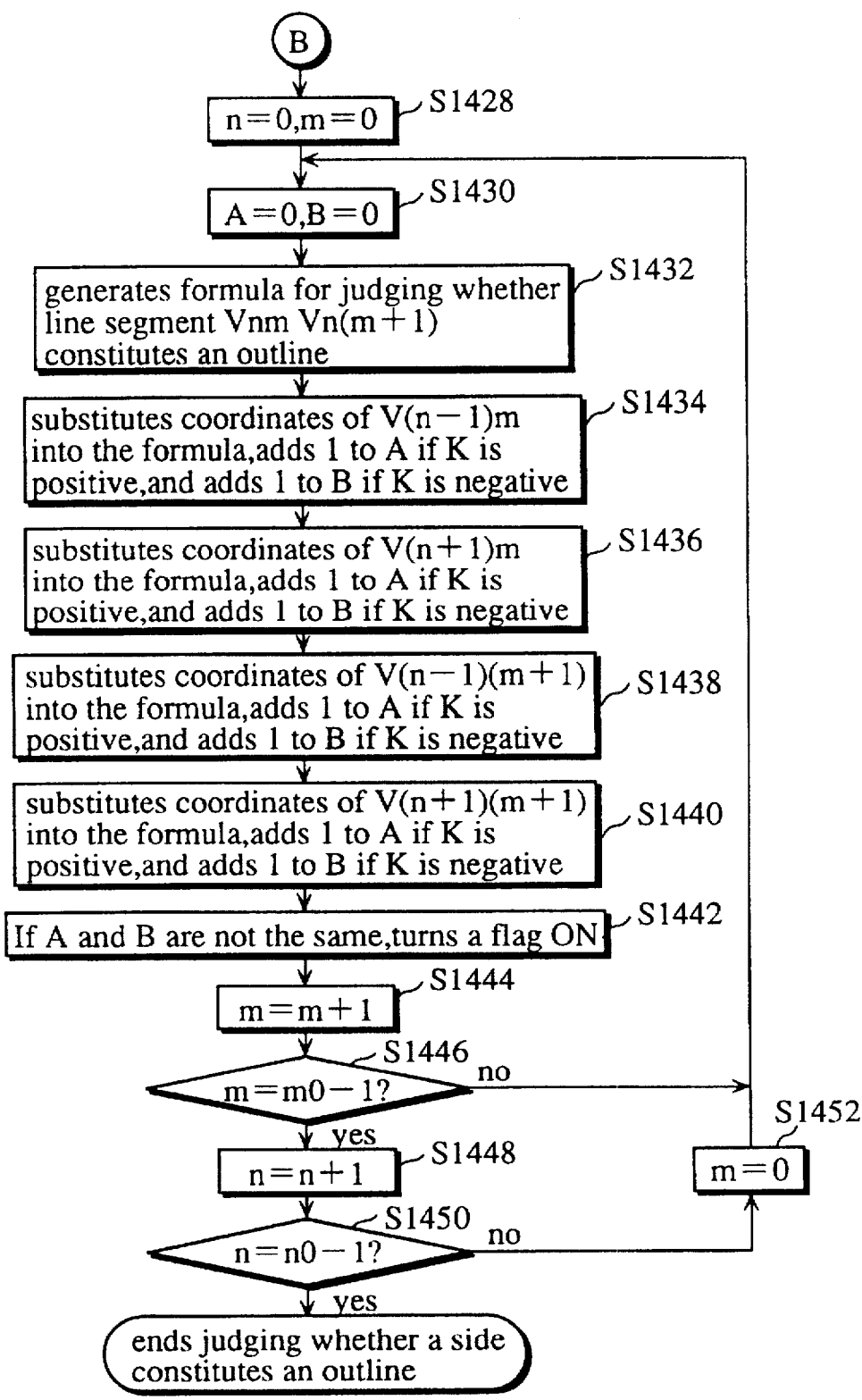
FIG. 14B shows a second half of a flowchart for operation of the edge judgement unit.

FIG. 14A and FIG. 14B explain operation of edge judgement unit 313.

In order to judge whether each side in the vertical direction constitutes a part of the outline, The first counter unit:

(Step 1402) sets value n of the third counter and value m of the forth count to 0; and (Step 1404) sets value A of the fifth counter and value B of the sixth counter B to 0.

The judging formula generation unit, (Step 1406) generates formula for judging whether line segment Vnm V(n+1)m specified by value n of the third counter and value m of the fourth counter constitutes a part of the outline.

The judging formula calculation unit calculates value K by substituting coordinates of vertex Vn(m−1), which is neighboring to line segment Vnm V(n+1)m, into the judging formula.

(Step 1408) The flag unit adds 1 to value A of the fifth counter if value K is positive, and adds 1 to value B of the sixth counter if value K is negative.

(Steps 1410–1414) The judging formula calculation unit and the flag unit executes the same processing for vertices Vn(m+1), V(n+1)(m−1), and V(n+1)(m+1), all of which are neighboring to line segment Vnm V(n+1)m.

(Step 1416) The flag unit turns a flag ON on line segment Vnm V(n+1)m if value A of the fifth counter and value B of the sixth counter are not the same.

The first counter unit:

(Step 1418) adds 1 to value m of the fourth counter;

(Step 1420) judges whether value m of the fourth counter corresponds to m0−1;

(Step 1422) goes back to Step 1402 if they do not correspond, and adds 1 to value n of the third counter if they correspond;

(Step 1424) judges whether value n of the third counter corresponds to n0−1;

(Step 1426) sets value m of the fourth counter to 0 if they do not correspond; and goes back to Step 1402. If they correspond, the first counter unit goes back to Step 1248.

Steps 1428–1452 are for judging whether each side in the horizontal direction constitutes a part of the outline. As the processing is almost the same as that of Steps 1402–1426, explanation is omitted.

By the above processing, sides which constitute the outline can be distinguished from other sides, as flags are turned ON on the sides constituting a part of the outline.

Figure 15:
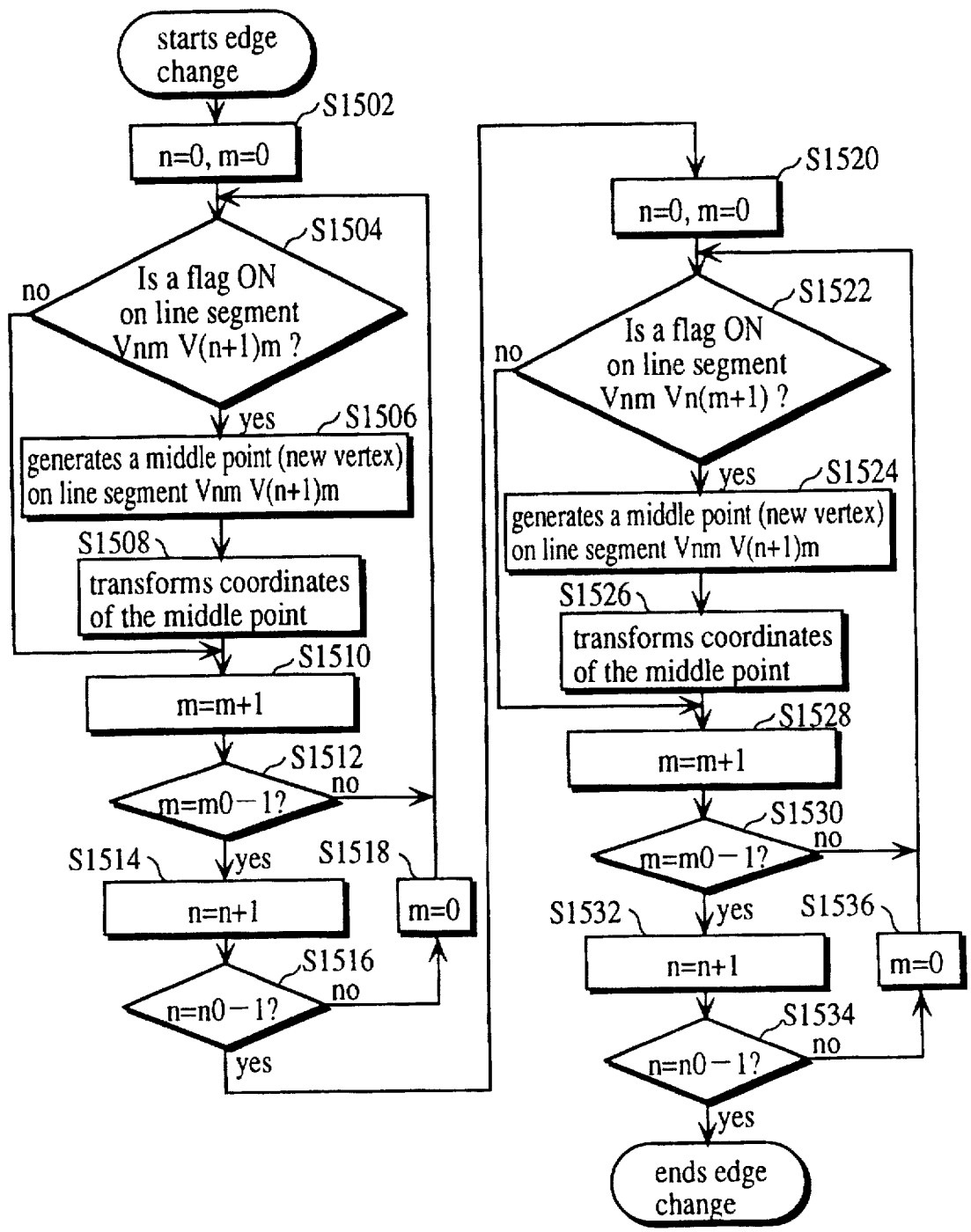
FIG. 15 shows a flowchart for operation of the edge change unit.

FIG. 15 shows operation of edge change unit 314. (Step 1502) The second counter unit sets value n of the seventh counter and value m of the eighth counter to 0.

(Step 1504) The division point generation unit judges whether a flag is ON on line segment Vnm V(n+1)m in the flag unit of edge judgement unit 313.

(Step 1506) If the flag is OFF, the division point generation unit goes to Step 1510. If the flag is ON, this unit calculates virtual-space coordinates of middle point VVs on line segment Vnm V(n+1)m.

(Step 1508) The middle point coordinate transformation unit transforms the virtual-space coordinates of middle point VVs to screen coordinates.

The second counter unit:

(Step 1510) adds 1 to value m of the eighth counter;

(Step 1512) judges whether value m corresponds to m0−1;

(Step 1514) goes back to Step 1504 if they do not correspond, adds 1 to value n of the seventh counter if they correspond;

(Step 1516) judges whether value n of the seventh counter corresponds to n0−1;

(Step 1518) sets value m of the eighth counter to 0 if they do not correspond; and goes to Step 1520 if they correspond.

The above mentioned Steps 1502–1518 are processing for generating a middle point on each side which constitutes a part of the outline in the vertical direction. Steps 1520–1536 are processing for generating a middle point on each side which constitutes a part of the outline in the horizontal direction. As the processing is almost the same as that of Steps 1502–1518, the explanation is omitted.

Figure 16:
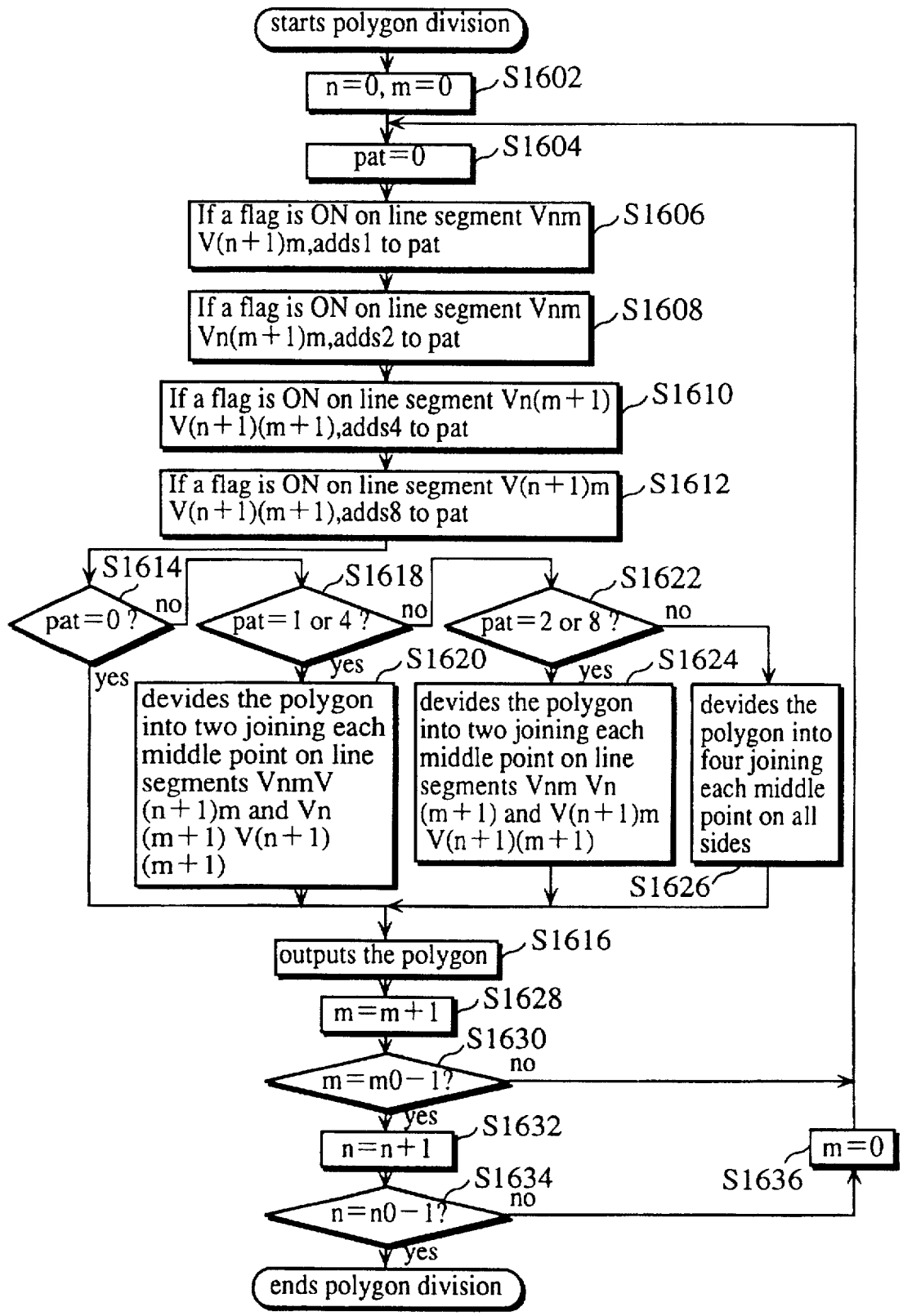
FIG. 16 shows a flowchart for operation of the polygon division unit.

FIG. 16 shows operation of polygon division unit 315.

(Step 1602) The third counter unit sets value n of the ninth counter and value m of the tenth counter to 0.

Flag number judgement unit 1604:

(Step 1604) substitutes 0 for variable pat;

(Step 1606) adds 1 to variable pat if a flag is ON on line segment Vnm V(n+1)m;

(Step 1608) adds 2 to variable pat if a flag is ON on line segment Vnm Vn(m+1);

(Step 1610) adds 4 to variable pat if a flag is ON on line segment Vn(m+1) V(n+1)(m+1);

(Step 1612) adds 8 to variable pat if a flag is ON on line segment V(n+1)m, V(n+1)(m+1); and (Step 1614) judges whether value of variable pat is 0.

The individual polygon division unit:

(Step 1616) outputs polygon Vnm V(n+1)m V(n+1)(m+1) Vn(m+1) to image generation unit 320, as this polygon does not include sides which constitute a part of the outline;

(Step 1618) when the flag number judgement unit judges that value of variable pat is 1 or 4, (Step 1620) divides polygon Vnm V(n+1)m V(n+1)(m+1) Vn(m+1) into two by a line joining middle point VVs generated on either line segment Vnm V(n+1)m or line segment Vn(m+1) V(n+1)(m+1) in vertical direction and a middle point on the opposite side, and goes to Step 1616;

(Step 1622) when the flag number judgement unit judges value of variable pat is 2 or 8, (Step 1620) divides polygon Vnm V(n+1)m V(n+1)(m+1) Vn(m+1) into two by a line joining middle point VVs generated on either line segment Vnm Vn(m+1) or line segment V(n+1)m V(n+1)(m+1) in horizontal direction and a middle point on the opposite side, and goes to Step 1616;

(Step 1622) when the flag number judgement unit judges that value of variable pat is other than 0, 1, 2, 4, and 8, (Step 1626) calculates a middle point on polygon Vnm V(n+1)m V(n+1)(m+1) Vn(m+1), and divides the polygon into four by the two lines joining middle points VVs on each sides, the point on intersection of the two lines being the calculated middle point of the polygon, and then goes to Step 1616.

The third counter unit:

(Step 1628) adds 1 to value m of the tenth counter;

(Step 1630) judges whether value m corresponds to m0−1;

(Step 1632) goes back to Step 1604 if they do not correspond, and adds 1 to value n of the ninth counter if they correspond;

(Step 1634) judges whether value n of the ninth counter corresponds to n0−1;

(Step 1636) sets value m of the tenth counter to 0 if they do not correspond; and goes back to Step 1604, and ends processing if they correspond.

As a result of the above processing, polygons whose sides constitute a part of the outline are divided into small polygons when a shape model is projected on a screen, so the outline of a shape model to be outputted to image generation device 320 becomes more precise.

(Embodiment 2)

Figure 17:
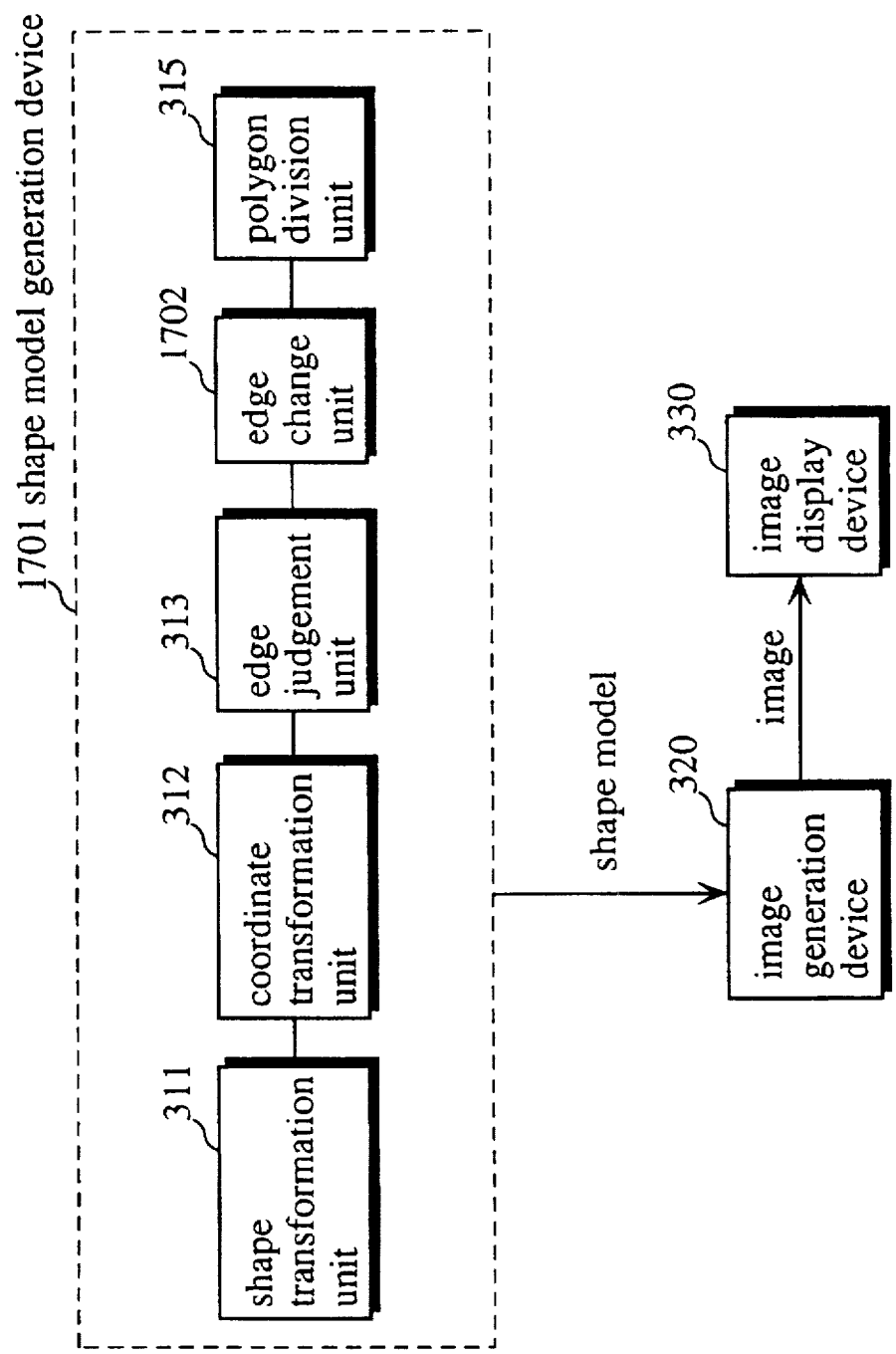
FIG. 17 shows construction the shape model generation device according to Embodiment 2 of the present invention.

FIG. 17 shows construction of a shape model generation device of Embodiment 2 of the present invention. The shape model generation device comprises shape transformation unit 311, coordinate transformation unit 312, edge judgement unit 313, edge change unit 1702, and polygon division unit 315. The parts which are the same as the shape model generation device of Embodiment 1 are given the same numbers with no explanation. Only different points are explained next.

Edge change unit 1702 comprises a threshold value storage unit, a fourth counter unit, a side length calculation unit, a scheduled middle point generation unit, a scheduled middle point coordinate transformation unit, a middle point distance calculation unit, and a scheduled middle point coordinate storage unit, all of which are not illustrated.

The threshold value storage unit stores threshold value L1 and threshold value L2 beforehand.

In the present Embodiment, threshold value L1 is set to a square of the longest length of a side which constitutes a part of the outline of a set of polygons into which a solid is divided by the standard division number. The standard division number is used for dividing a solid into polygons in order to display a high-quality image in a conventional image generation system. If a length of a side which constitutes a part of the outline is shorter than the longest length of a side which constitutes a part of the outline of a set of polygons into which a solid is divided by the standard division number, the side is not divided. So the number of polygons does not increase.

Threshold value L2 is set to a square of a predetermined value which is equal to or greater than the size of one pixel on the display screen of image display device 330 in an image generation system. Then, a new middle point is generated only when distance between a side which constitutes a part of the outline and a newly generated middle point is longer than the size of one pixel on the screen. The reason is a high-quality image cannot be obtained by generating a new middle point if the distance is shorter than one pixel on a display screen.

The fourth counter unit of edge change unit 1702:
(1) on being activated by edge judgement unit 313, reads out numbers of n0 in the vertical direction and m0 in the horizontal direction of vertices Vnm of the polygon mesh stored in the screen coordinate storage unit of coordinate transformation unit 312, sets value n of an eleventh counter and value m of a twelfth counter to 0, and activates the side length calculation unit;
(2) on receiving instruction of adding 1 from the side length calculation unit or the middle point distance calculation unit, adds 1 to value m of the twelfth counter;
(3) judges whether value m of the twelfth counter corresponds to m0−1, activates the side length calculation unit if they don't correspond, and adds 1 to value n of the eleventh counter if they correspond;
(4) judges whether value n of the eleventh counter corresponds to n0−1, sets value m of the twelfth counter to 0 and activates the side length calculation unit; and
(5) sets value n of the eleventh counter and value m of the twelfth counter to 0, activates the side length calculation unit when they correspond for the first time in (4), and activates polygon division unit 315 when they correspond for the second time.

The side length calculation unit:
(1) on being activated by the fourth counter unit, reads out value n of the eleventh counter and value m of the twelfth counter, and judges whether a flag is ON on line segment Vnm V(n+1)m in the flag unit of edge judgement unit 313;
(2) if a flag is OFF, instructs the fourth counter unit to add 1;
(3) if a flag is ON, reads out screen coordinates of vertices Vnm and V(n+1)m from the screen coordinate storage unit of coordinate transformation unit 312, and substitutes them for X1, Y1 and X2, Y2 in Formula (4) to obtain L, which is a square of the length of the side; and $$L=(X2-X1)^2+(Y2-Y1)^2 \quad \text{Formula (4)}$$

(4) judges whether the calculated value L is greater than value L1 stored in the threshold value storage unit beforehand, activates the scheduled middle point generation unit if it is greater, and turns a flag OFF in the flag unit of edge judgement unit 313 if it is not greater.

Scheduled middle point generation unit:
(1) on being activated by the side length calculation unit, stores contents in the screen coordinate storage unit of coordinate transformation unit 312 in the scheduled middle point coordinate storage unit, and reads out value n of the eleventh counter and value m of the twelfth counter;
(2) fetches increment $\Delta a$ of parameter a and increment $\Delta b$ of parameter b decided by the three-dimensional vertex coordinate calculation unit of shape transformation unit 311;
(3) obtains virtual-space coordinates of middle point VVs on line segment Vnm V(n+1)m by substituting $\{A_0+(2n+1)\Delta a/2\}$ and $(B_0+m\Delta b)$ for parameters a and b in Formula (1) stored in the solid function storage unit of shape transformation unit 311 until value n of the eleventh counter corresponds to n0−1 for the first time;
(4) notifies the scheduled middle point coordinate transformation unit of virtual-space coordinates (X, Y, Z) of middle point VVs;
(5) after value n of the eleventh counter corresponds to n0−1 for the first time in (3), obtains virtual-space coordinates of middle point VVs on line segment Vnm Vn(m+1) by substituting $(A_0+n\Delta a)$ and $\{B_0+(2m+1)\Delta b/2\}$ for parameters a and b in Formula (1) stored in the solid function storage unit of shape transformation unit 311 and executes the same processing as (4); and
(6) on being activated again by the middle point distance calculation unit, executes processing of (3)–(5), substituting $\{A_0+(4n+1)\Delta a/4\}$ and $(B_0+m\Delta b)$ for parameters a and b in Formula (1) to obtain coordinates of ¼ middle point in the vertical direction and $\{A_0+(4n+3)\Delta a/4\}$ and $(B_0+m\Delta b)$ for parameters a and b in Formula (1) to obtain coordinates of ¾ middle point in the vertical direction in step (3), and substituting $(A_0+n\Delta a)$ and $\{B_0+(4m+1)\Delta b/4\}$ for parameters a and b in Formula (1) to obtain coordinates of ¼ middle point in the horizontal direction and $(A_0+n\Delta a)$ and $\{B_0+(4m+3)\Delta b/4\}$ for parameters a and b in Formula (1) to obtain coordinates of ¾ middle point in the horizontal direction in step (5).

The scheduled middle point cooridinate transformation unit, on receiving three-dimensional coordinates (X, Y, Z) of middle point VVs from the scheduled middle point generation unit, executes the same processing that was used for the view point coordinate calculation unit of coordinate transformation unit 312, and according to Formula (2), notifies the middle point distance calculation unit of the three-dimensional coordinates (x', y', z') of middle point VVs in the view point coordinate system as coordinates of middle point VVs.

The middle point distance calculation unit:
(1) on receiving notification of coordinates (x', y') of middle point VVs from the scheduled middle point coordinate transformation unit, replaces them with (X, Y);
(2) until value n of the eleventh counter corresponds to n0−1 for the first time, reads out value n of the eleventh counter and value m of the twelfth counter, and also reads out coordinates of vertices Vnm and V(n+1)m stored in the scheduled middle point coordinate storage unit as (X1, Y1) and (X2, Y2);

(3) obtains square value of distance between middle point VVs and line segment Vnm V(n+1)m by substituting (X, Y), (X1, Y1), (X2, Y2) into Formula (5);

$$LD=\{(Y2-Y1)(X-X1)-(X2-X1)(i\ Y-Y1)\}^2/\{(Y2-Y1)^2+(X2-X1)^2\}$$  Formula (5)

(4) judges whether value LD is greater than threshold value L2 stored in the threshold value storage unit;

A line segment Vnm V(n+1) m of a polygon is approximated by a line, but in reality, it is a curved surface. So by obtaining value LD, it is possible to estimate original curvature of line segment Vnm V(n+1)m, which constitutes part of the outline. And threshold value L2 is set to a certain value so that new middle point VVs is generated when the curvature is great.

(5) if it is greater than value L2, stores the notified (x', y', z') of middle point VVs in the scheduled middle point coordinate storage unit and activates the scheduled division point generation unit again;

(6) if it is not greater, turns a flag OFF in the flag unit of edge judgement unit 313, and instructs the fourth counter unit to add 1;

(7) after value n of the eleventh counter corresponds to n0−1 for the first time in (2), reads out value n of the eleventh counter and value m of the twelfth counter, reads out (x', y') of line segment Vnm Vn(m+1) stored in the scheduled middle point coordinate storage unit as (X1, Y1), (X2, Y2), and executes the same processing as (3)–(6);

(8) calculates on receiving notification of coordinates of two new middle points by the re-activation of the scheduled division point generation unit, calculates distance LD from each notified new middle point to a corresponding side joining an original vertex and middle point in the side of the notified new middle point; and (9) after new vertex is generated, instructs the fourth counter unit to add 1.

Polygon division unit 315 divides only those polygons that include newly generated middle points as in Embodiment 1. Specifically, when one side constitutes a part of the outline, it divides the polygon into two, and if two or more sides constitute a part of the outline, it divides the polygon into four. If a new middle point is generated on a side which constitutes a part of the outline of the divided polygon, the polygon is further divided.

Figure 1:
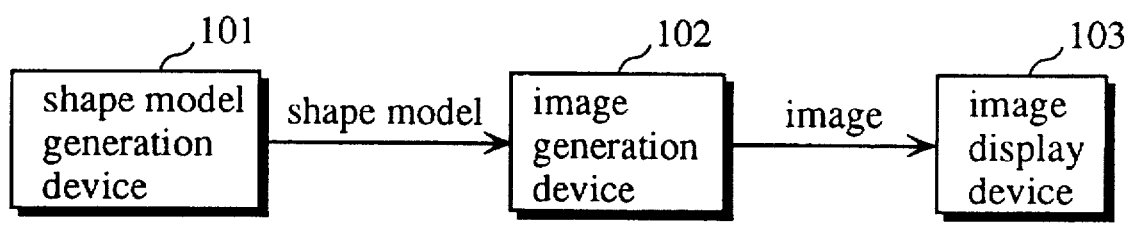
FIG. 1. shows construction of a conventional three-dimensional image generation system.
Figure 2A:
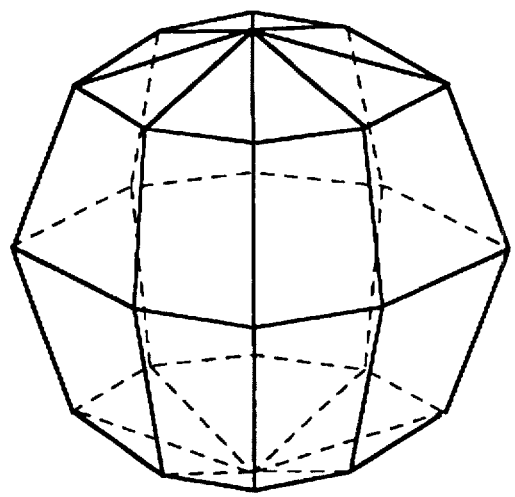
FIG. 2A shows a shape model expressed by a set of polygons generated by the conventional shape model generation device.
Figure 2B:
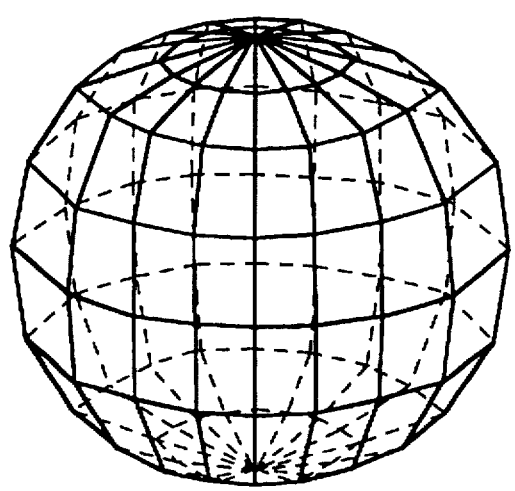
FIG. 2B shows a conventional shape model expressed precisely by dividing the shape model of FIG. 2A by a standard division number.
Figure 18A:
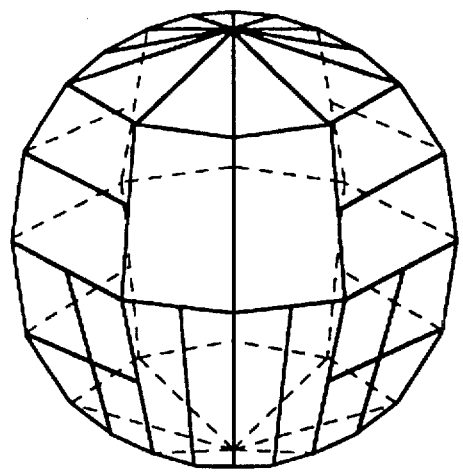
FIG. 18A is a shape model projected on a screen, the shape model being obtained when threshold value L1 and L2 are set to rather large values.

FIG. 18A shows a shape model projected on a screen, in which rather great threshold values L1 and L2 are set, L1 being square of the longest length of a side which constitutes a part of the outline of a set of polygons into which a shape model is divided by the standard division number, and L2 corresponding to the size of three pixels. This shape model consists of 46 polygons, but its outline is as accurate as that of the shape model which consists of 60 polygons in FIG. 11 or shape model which consists of 128 polygons in FIG. 2B in the outline.

Figure 18B:
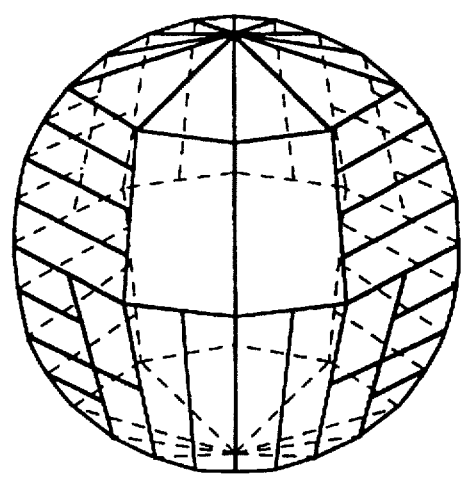
FIG. 18B is a shape model projected on a screen, the shape being obtained when threshold value L1 and L2 are set to rather small values.

FIG. 18B shows a shape model projected on a screen, in which rather small threshold values L1 and L2 are set, L1 being a square of half the length of a side which constitutes a part of the outline of a set of polygons into which a shape model is divided by the standard division number, and L2 corresponding to the size of one pixel. This shape model consists of 76 polygons, but its outline is more accurate than that of the shape model in FIG. 2B which consists of 128 polygons.

Figure 19A:
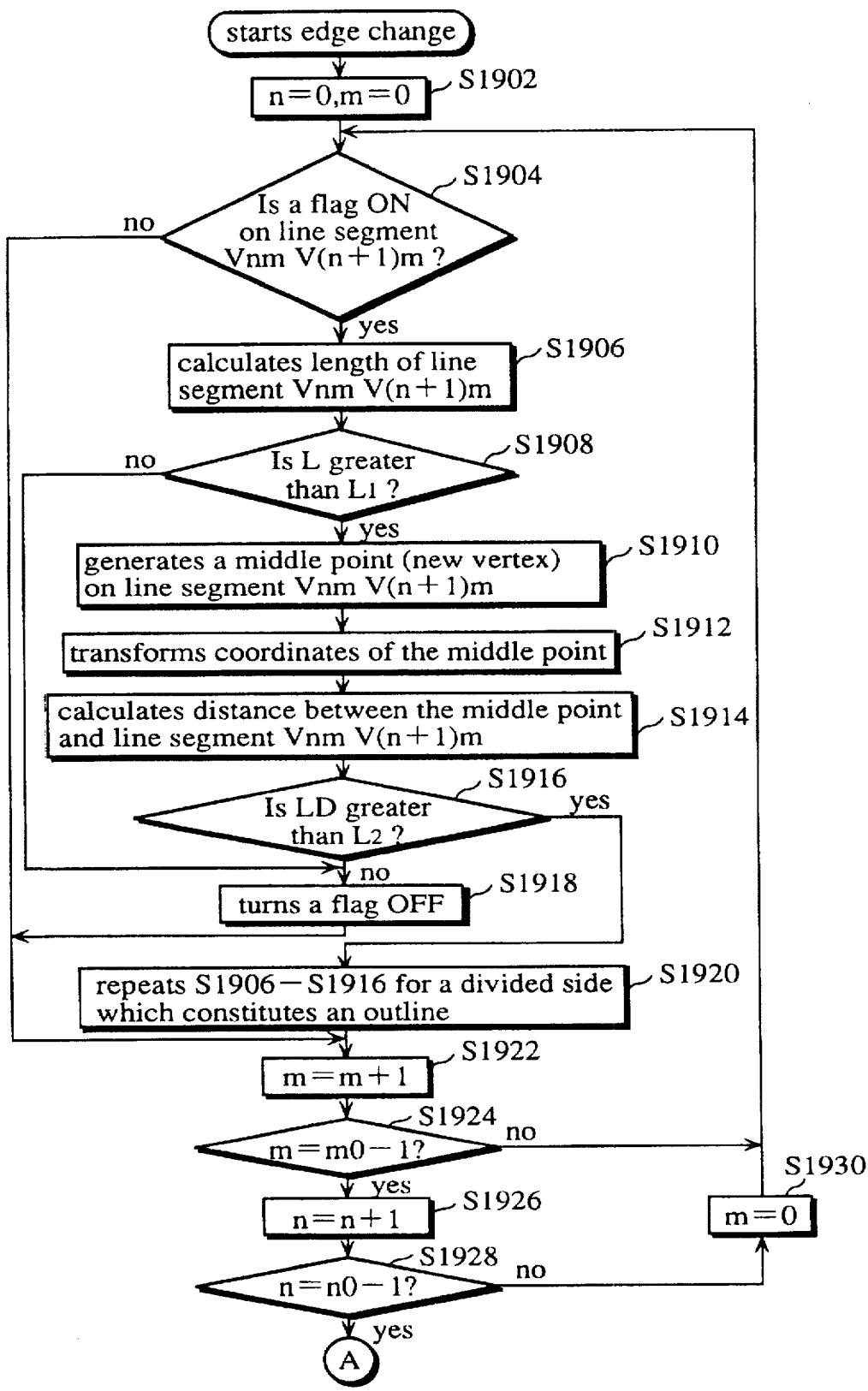
FIGS. 19(a–b) show a flowchart for operation of the present Embodiment.
Figure 19B:
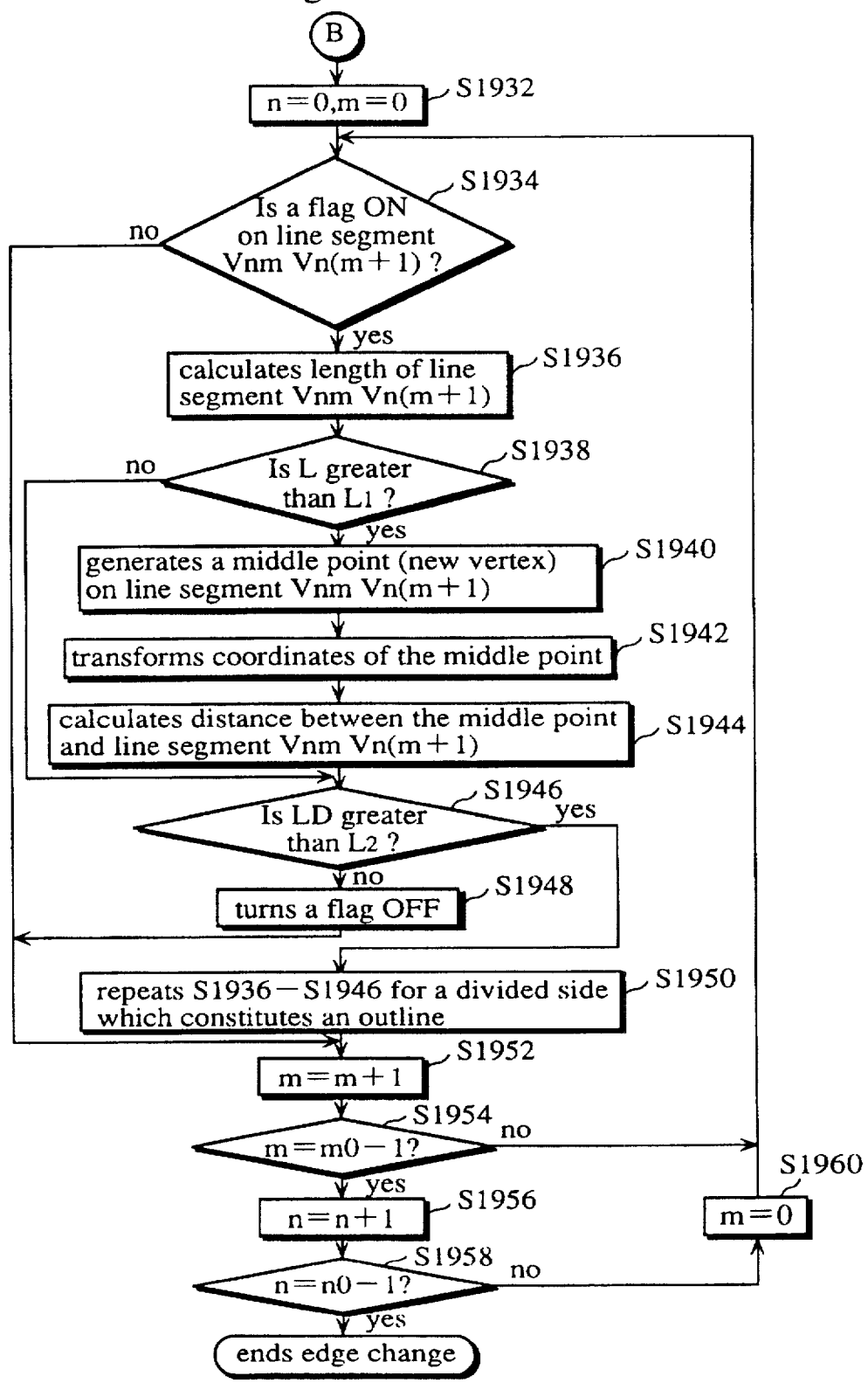

Next, operation of the present Embodiment is explained by means of flowcharts in FIG. 19A and FIG. 19B. Only operation of edge change unit 314, which is different from Embodiment 1, is explained.

(Step 1902) Edge change unit 314 sets value n of the eleventh counter and value m of the twelfth counter to 0.

The side length calculation unit:

(Step 1904) judges whether a flag is ON on line segment Vnm V(n+1)m by checking the flag unit of edge judgement unit 313;

(Step 1906) goes to Step 1922 if the flag is OFF, calculates square of the length of line segment Vnm V(n+1)m using Formula (4) if the flag is ON;

(Step 1908) judges whether calculated value L is greater than threshold value L1; and (Step 1918) turns a flag OFF in the flag unit if it is not greater.

(Step 1912) The scheduled middle point coordinate transformation unit calculates screen coordinates of middle point VVs.

The middle point distance calculation unit:

(Step 1914) calculates LD, which is a square of distance between middle point VVs and line segment Vnm V(n+1)m using Formula (5);

(Step 1916) judges whether value LD is greater than threshold value L2;

(Step 1918) turns a flag OFF in the edge judgement unit if it is not greater; and (Step 1920) generates middle point VVs and repeats Steps 1906–1916 if it is greater.

The fourth counter unit:

(Step 1924) adds 1 to value m of the twelfth counter, judges whether value m corresponds to m0−1 in Step 1922;

(Step 1926) goes back to Step 1904 if they don't correspond, adds 1 to value n of the eleventh counter if they correspond;

(Step 1928) judges whether value n corresponds to n0−1; and sets value m of the twelfth counter to 0 and goes back to Step 1904 if they do not correspond; goes to Step 1032 if they correspond.

Steps 1902–1930 are for generating new middle points on each vertical side which constitutes a part of the outline of a set of polygons. Steps 1932–1960 are for horizontal sides, and the processing is the same as Steps 1902–1930. So the explanation is omitted.

(Embodiment 3)

Figure 20:
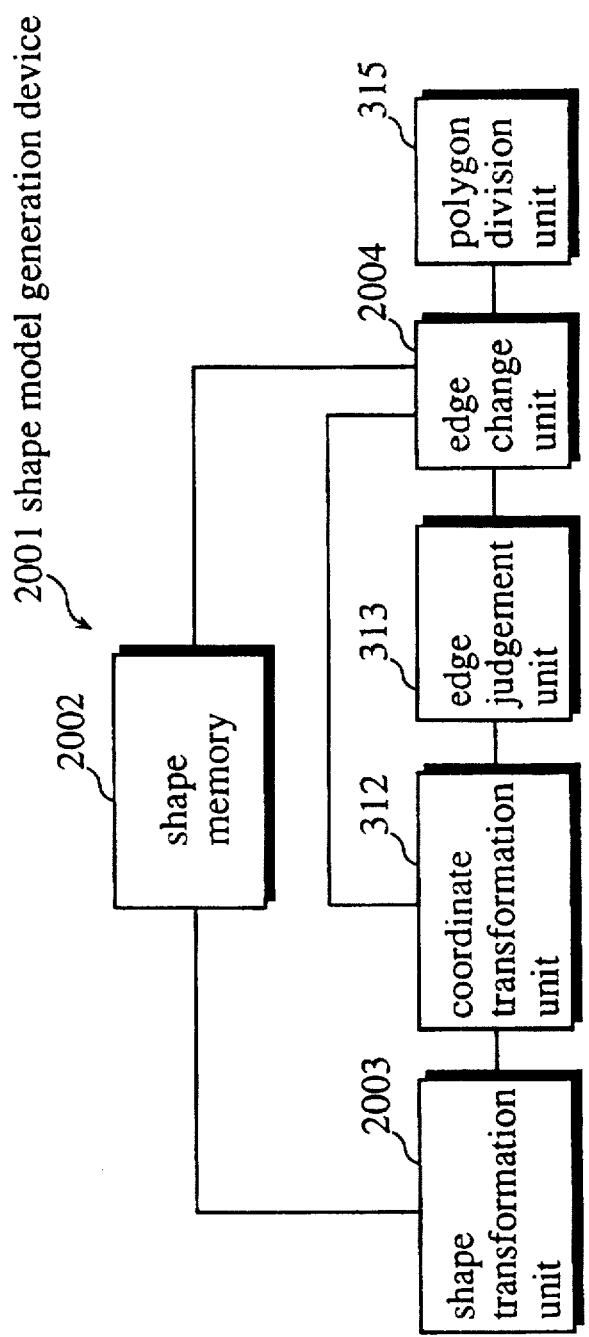
FIG. 20 shows construction of the shape model generation device of Embodiment 3 of the present invention.

FIG. 20 shows construction of a shape model generation device of the present invention. This shape model generation device comprises shape memory 2002, shape transformation unit 2003, coordinate transformation unit 312, edge judgement unit 313, edge change unit 2004, and polygon division unit 315. Parts which are the same as Embodiment 1 are given the same number without explanation. Only different points are explained next.

Figure 21:
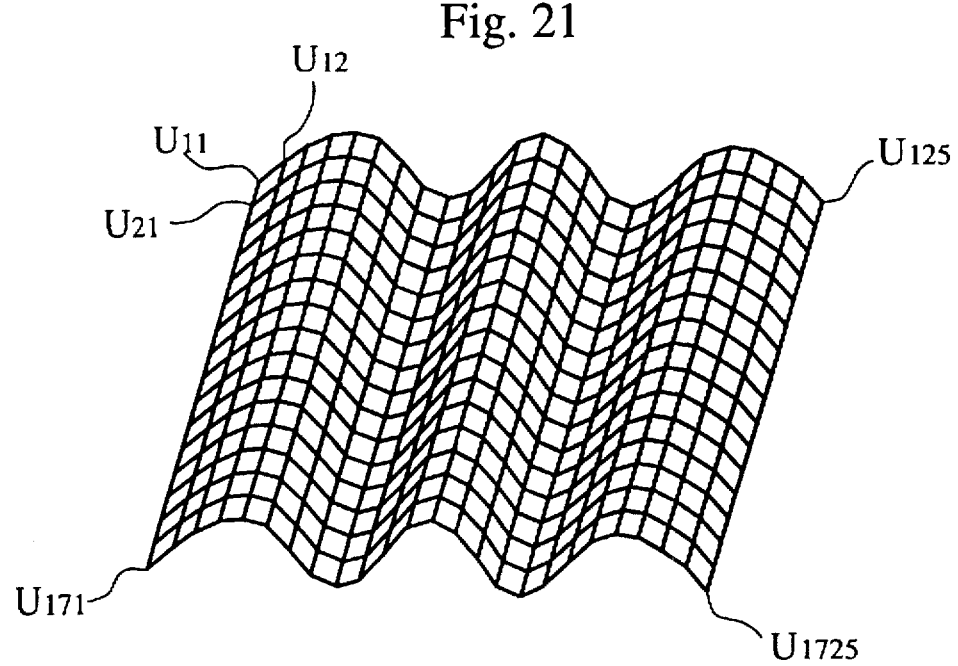
FIG. 21 shows shape data stored in the shape memory

Shape memory 2002 stores shape data expressed by three-dimensional coordinates. Shape memory 2002 stores three-dimensional coordinates of each vertex of a polygon mesh approximated by quadrangular polygons as shown in FIG. 21. This shape data consists of 425 vertices such as $U_{11}$, $U_{21}, \ldots U_{1725}$ resulted from 17×25 vertices. The polygon mesh data has 384 polygons.

Shape transformation unit 2003 reads out coordinates of vertex Unm, whose coordinates in both vertical and horizontal lines are odd numbers, from shape memory 2002, and notifies coordinate transformation unit 312 of them. Therefore, shape transformation unit 2003 transforms the shape data to a shape model which consists of 117 vertices of 96 polygons.

Figure 22:
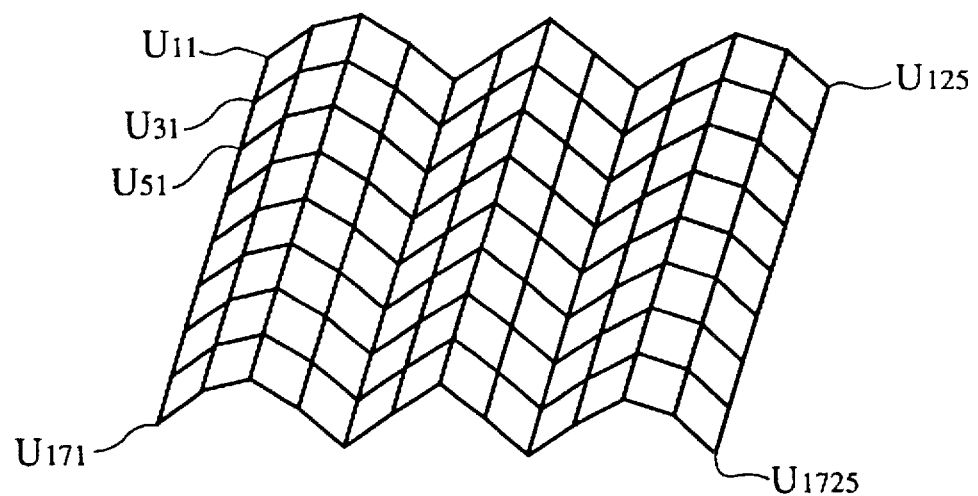
FIG. 22 shows shape data to be transformed by the shape transformation unit.

Coordinate transformation unit 312 transforms the notified three-dimensional coordinates to coordinates in the view point coordinate system as explained in Embodiment 1, and stores them in the screen coordinate storage unit (not illustrated) as screen coordinates. FIG. 22 shows that a set of polygons stored in the screen coordinate storage unit is projected on a screen.

Edge judgement unit 313 judges whether a side of a set of polygons stored in the screen coordinate storage unit of coordinate transformation unit 312 constitutes a part of the outline as explained in Embodiment 1. The shape model in Embodiment 3 is not closed like that in Embodiment 1. So when four neighboring vertices of a side cannot be extracted in using the judging formula, edge judgement unit 313 turns a flag ON as such side constitutes a part of the outline.

Edge change unit 2004 stores contents in the screen coordinate storage unit of coordinate transformation unit 312 in the middle point coordinate storage unit (not illustrated). This unit 2004 checks flags in edge judgement unit 313, checks line segment Unm Un(m+2) or line segment Unm U(m+2)m on which a flag is ON, reads out virtual-space coordinates of vertex Un(m+1) or U(n+1)m, which is a middle point on either line segment from shape memory 2002. This unit applies the same processing that was used for coordinate transformation unit 312 to the virtual-space coordinates, transforms them to screen coordinates, and additionally stores them in the middle point coordinate storage unit.

Figure 23:
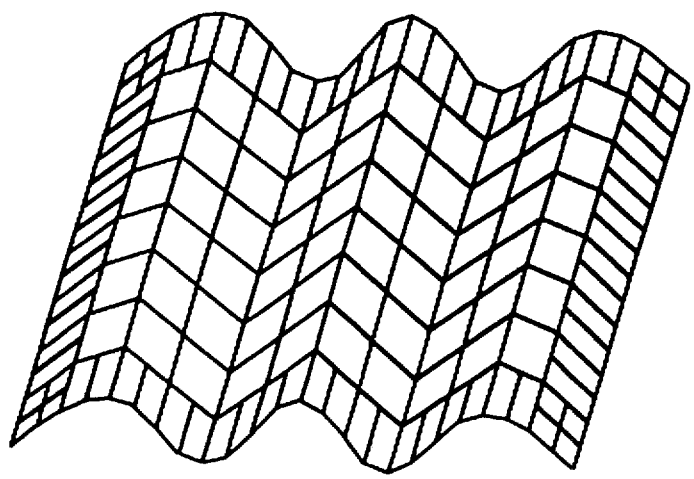
FIG. 23 shows a generated shape model.

Polygon division unit 315 divides polygon Unm U(2n+1)m U(2n+1)(2m+1) Un(2m+1) into two if one side constitutes a part of the outline, and divides the polygon into four when two sides constitute a part of the outline. FIG. 23 shows a shape model thus generated by the shape model generation device. This shape model consists of 136 polygons, but the accuracy of the outline is the same as that of the original shape model which consists of 384 polygons shown in FIG. 21.

According to the present Embodiment, by using shape memory 2002, a shape model which consists of small number of polygons can be generated for a curved surface having a complicated shape which cannot be expressed by a formula.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. In an image generation system having
    a shape model generation device for generating a set of polygons which approximates to a given solid and outputting vertex coordinates of each polygon in a screen coordinate system,
    an image generation device for generating images applying shading and the like to each polygon on receiving the vertex coordinates from the shape model generation device, and
    an image display device for displaying an image generated by the image generation device,
    the shape model generation device comprising:
        a shape transformation means for transforming the solid having a given curved surface to the set of polygons approximating to a shape of the solid in a virtual-space, with a number of polygons being smaller than a standard division number for dividing the solid into polygons in order to display high-quality image by the image display device;
        a coordinate transformation means for projecting the set of polygons transformed by the shape transformation means on a screen based on a designated view point and direction in the virtual-space, and transforming vertex coordinates of each polygon of the set of polygons to two-dimensional screen coordinates;
        an edge judgement means for judging whether each side of each screen-projected polygon constitutes a part of an outline of the set of screen-projected polygons;
        an edge change means for generating a new vertex in the virtual-space on any side which the edge judgement means judged to constitute a part of the outline and transforming coordinates of the new vertex to two-dimensional screen coordinates; and
        a polygon division means for dividing a screen-projected polygon including any side which the edge judgement means judged to constitute a part of the outline into smaller screen-projected polygons at the new vertex transformed by the edge change means.

2. The shape model generation device of claim 1, wherein the shape transformation means includes:
    a first solid storage unit for storing functions which express the shape of the solid beforehand;
    a polygon mesh generation unit for generating a polygon mesh in which each polygon is seemingly quadrangular; and
    an intersection point coordinate calculation unit for calculating virtual-space coordinates of each intersection point of the polygon mesh from the functions stored in the first solid storage unit, the virtual-space coordinates being used as data for expressing the solid.

3. The shape model generation device of claim 2, wherein the edge judgement means includes an outline side detection unit for detecting any side which constitutes a part of the outline of the set of screen-projected polygons from relation of each side and their neighboring two sides in the same direction.

4. The shape model generation device of claim 3, wherein the edge judgement means further includes a vertex number calculation unit for dividing a screen plane on which the set of polygons is projected into two by an extended line of any side of the screen-projected polygon, counting how many vertices exist in each region resulting from the division by the extended line, and recognizing that the side constitutes a part of the outline if the number of the vertices in each region is not equal.

5. The shape model generation device of claim 4, wherein the edge change means includes a middle point generation unit for generating a middle point on any side which the edge judgement means judged to constitute a part of the outline as a new vertex in the virtual-space and transforming coordinates of the middle point to two-dimensional screen coordinates.

6. The shape model generation device of claim 5 further includes an edge change prohibition means for prohibiting generation of a new vertex by the edge change means when a length of any side which the edge judgement means judged to constitute a part of the outline is equal to or shorter than a predetermined first threshold value, the first threshold value corresponding to a value of longest length of a side of a screen-projected polygon for expressing accurate outline.

7. The shape model generation device of claim 6, wherein the edge change means further includes a middle point generation cancellation unit for calculating distance between the side which constitutes a part of the outline and the new vertex generated by the middle point generation unit, and cancelling the new vertex when the distance is equal to or shorter than a predetermined second threshold value.

8. The shape model generation device of claim 7, wherein a smallest of the second threshold value corresponds to size of a pixel in the image display device.

9. The shape model generation device of claim 8, wherein the polygon division means includes:
   a dividing-into-two unit for dividing a screen-projected polygon into two, the polygon including one side which the edge judgement means judged to constitute a part of the outline; and
   a dividing-into-four unit for dividing a screen-projected polygon into four, the polygon including two or more sides which the edge judgement means judged to constitute a part of the outline.

10. The shape model generation device of claim 9 further includes:
    a re-edge-change means for generating a new vertex in the virtual-space on a side of the screen-projected polygon divided by the polygon division means, and transforming coordinates of the new vertex to two-dimensional screen coordinates;
    a re-edge-change prohibition means for prohibiting generation of a new vertex by the re-edge change means when length of the side treated by the re-edge change means is equal to or shorter than a predetermined first threshold value;
    a re-edge-change cancellation means for calculating distance between the side and new vertex treated by the re-edge change means and cancelling the new vertex when the distance is equal to or shorter than a predetermined second threshold value; and
    a re-polygon-division means for re-dividing a screen-projected polygon which was divided at the new vertex generated by the re-edge-change means.

11. The shape model generation device of claim 2 further includes an edge change prohibition means for prohibiting generation of a new vertex by the edge change means when a length of any side which the edge judgement means judged to constitute a part of the outline is equal to or shorter than a predetermined first threshold value, the first threshold value corresponding to a value of longest length of a side of a screen-projected polygon for expressing accurate outline.

12. The shape model generation device of claim 11, wherein the edge judgement means includes an outline side detection unit for detecting any side which constitutes a part of the outline of the set of screen-projected polygons from relation of each side and their neighboring two sides in the same direction.

13. The shape model generation device of claim 12, wherein the edge judgement means further includes a vertex number calculation unit for dividing a screen plane on which the set of polygons is projected into two by an extended line of any side of the screen-projected polygon, counting how many vertices exist in each region resulting from the division by the extended line, and recognizing that the side constitutes a part of the outline if the number of the vertices in each region is not equal.

14. The shape model generation device of claim 13, wherein the edge change means includes a middle point generation unit for generating a middle point on any side which the edge judgement means judged to constitute a part of the outline as a new vertex in the virtual-space and transforming coordinates of the middle point to two-dimensional screen coordinates.

15. The shape model generation device of claim 2 further includes:
    a re-edge-change means for generating a new vertex in the virtual-space on a side of the screen-projected polygon divided by the polygon division means, and transforming coordinates of the new vertex to two-dimensional screen coordinates;
    a re-edge-change prohibition means for prohibiting generation of a new vertex by the re-edge change means when length of the side treated by the re-edge change means is equal to or shorter than a predetermined first threshold value;
    a re-edge-change cancellation means for calculating distance between the side and new vertex treated by the re-edge change means and cancelling the new vertex when the distance is equal to or shorter than a predetermined second threshold value; and
    a re-polygon-division means for re-dividing a screen-projected polygon which was divided at the new vertex generated by the re-edge-change means.

16. The shape model generation device of claim 1, wherein the shape transformation means includes:
    a second solid storage unit for storing the shape of the solid as virtual-space coordinates of vertices of the set of quadrangular polygons; and
    a vertex read-out unit for reading out coordinates stored in the second solid storage unit at intervals, the coordinates being used as data for expressing a solid.

17. The shape model generation device of claim 16, wherein the edge judgement means includes an outline side detection unit for detecting any side which constitutes a part of the outline of the set of screen-projected polygons from relation of each side and their neighboring two sides in the same direction.

18. The shape model generation device of claim 17, wherein the edge judgement means further includes a vertex number calculation unit for dividing a screen plane on which the set of polygons is projected into two by an extended line of any side of the screen-projected polygon, counting how many vertices exist in each region resulting from the division by the extended line, and recognizing that the side constitutes a part of the outline if the number of the vertices in each region is not equal.

19. The shape model generation device of claim 18, wherein the edge change means includes a middle point read-out transformation unit for reading out a middle point on any side which the edge judgement means judged to constitute a part of the outline as a new vertex from the second solid storage unit and transforming coordinates of the new vertex to two-dimensional screen coordinates.

20. The shape model generation device of claim 19 further includes an edge change prohibition means for prohibiting generation of a new vertex by the edge change means when a length of any side which the edge judgement means judged to constitute a part of the outline is equal to or shorter than a predetermined first threshold value, the first threshold value corresponding to a value of longest length of a side of a screen-projected polygon for expressing accurate outline.

21. The shape model generation device of claim 20, wherein the edge change means further includes:

a middle point read-out transformation cancellation unit for calculating distance between the side which constitutes a part of the outline and the vertex read out by the middle point read-out transformation unit, and cancelling the vertex when the distance is equal to or shorter than the predetermined second threshold value.

22. The shape model generation device of claim 21, wherein a smallest of the second threshold value corresponds to size of a pixel in the image display device.

23. The shape model generation device of claim 22, wherein the polygon division means includes:

a dividing-into-two unit for dividing a screen-projected polygon into two, the polygon including one side which the edge judgement means judged to constitute a part of the outline; and a dividing-into-four unit for dividing a screen-projected polygon into four, the polygon including two or more sides which the edge judgement means judged to constitute a part of the outline.

24. The shape model generation device of claim 23 further includes:

a re-edge-change means for reading out a middle point on a side of the screen-projected polygon divided by the polygon division means as a new vertex from the second solid storage unit, and transforming coordinates of the new vertex to two-dimensional screen coordinates; and a re-edge-change prohibition means for prohibiting generation of a new vertex by the re-edge-change means when length of the side treated by the edge judgement means is equal to or shorter than the predetermined first threshold value;

a re-edge-change cancellation means for calculating distance between a side and the new vertex treated by the re-edge-change means, and cancelling the new vertex when the distance is equal to or shorter than the predetermined second threshold value; and a re-polygon division means for re-dividing the screen-projected polygon divided at the new vertex read out by the re-edge-change means.

25. The shape model generation device of claim 16 further includes:

a re-edge-change means for reading out a middle point on a side of the screen-projected polygon divided by the polygon division means as a new vertex from the second solid storage unit, and transforming coordinates of the new vertex to two-dimensional screen coordinates; and a re-edge-change prohibition means for prohibiting generation of a new vertex by the re-edge-change means when length of the side treated by the edge judgement means is equal to or shorter than the predetermined first threshold value;

a re-edge-change cancellation means for calculating distance between a side and the new vertex treated by the re-edge-change means, and cancelling the new vertex when the distance is equal to or shorter than the predetermined second threshold value; and a re-polygon division means for re-dividing the screen-projected polygon divided at the new vertex read out by the re-edge-change means.

* * * * *